(12) United States Patent
Nara et al.

(10) Patent No.: US 10,351,350 B2
(45) Date of Patent: Jul. 16, 2019

(54) TABLE CIRCULATION GUIDE DEVICE

(71) Applicant: NIPPON THOMPSON CO., LTD., Tokyo (JP)

(72) Inventors: Tsuguyoshi Nara, Mino (JP); Masashi Matsui, Mino (JP); Daisuke Sato, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 16/019,744

(22) Filed: Jun. 27, 2018

(65) Prior Publication Data

US 2019/0009990 A1    Jan. 10, 2019

(30) Foreign Application Priority Data

Jul. 5, 2017 (JP) ................................ 2017-131822
Sep. 29, 2017 (JP) ................................ 2017-190654

(51) Int. Cl.
*B61B 13/00* (2006.01)
*B65G 39/00* (2006.01)
*B65G 35/06* (2006.01)

(52) U.S. Cl.
CPC .................. *B65G 35/06* (2013.01)

(58) Field of Classification Search
CPC ............................. B61B 13/00; B65G 39/00
USPC ......... 104/118, 119; 105/29.1, 30, 141, 167; 198/803.15, 750.1
See application file for complete search history.

(56) References Cited

U.S. PATENT DOCUMENTS

| 1,412,383 | A | * | 4/1922 | Barrow | B61F 3/04 105/165 |
| 3,872,793 | A | * | 3/1975 | Patin | B61C 11/00 104/130.11 |
| 4,158,315 | A | * | 6/1979 | Kensrue | B23Q 1/262 173/32 |
| 4,505,464 | A | * | 3/1985 | Chitayat | B23Q 1/015 269/21 |
| 5,047,676 | A | * | 9/1991 | Ichikawa | B23Q 1/58 310/12.19 |

(Continued)

FOREIGN PATENT DOCUMENTS

| JP | 257718 A | 2/1990 |
| JP | 11208859 A | 8/1999 |

(Continued)

OTHER PUBLICATIONS

US 2002/0017537 A1, Barklin et al., Feb. 14 (Year: 2002).*
US 2003/0221935 A1 Barklin et al., Dec. 4 (Year: 2003).*
US 2007/0295442 A1, Minakawa, Dec. 27 (Year: 2007).*

*Primary Examiner* — Douglas A Hess
(74) *Attorney, Agent, or Firm* — Browdy and Neimark, PLLC

(57) ABSTRACT

This table circulation guide device includes sliders and carriage attached to a table. In a working area, the table is guided by the sliders straddling straight track rails. In a non-working area, the table is guided by the carriages traveling on a curved track rail. An endless circulation circuit is formed by the straight track rails and the curved track rail. In the working area of the circuit, the table travels via the sliders straddling the straight track rails. In the non-working area of the circuit, the table travels via the carriages located between the sliders.

17 Claims, 28 Drawing Sheets

(56) References Cited

U.S. PATENT DOCUMENTS

| | | | | |
|---|---|---|---|---|
| 5,086,705 | A * | 2/1992 | Jarvis | B23Q 1/262 |
| | | | | 105/141 |
| 5,445,080 | A * | 8/1995 | Austin | B61B 13/04 |
| | | | | 104/119 |
| 5,735,214 | A * | 4/1998 | Tsuboi | F16C 29/005 |
| | | | | 104/106 |
| 6,098,550 | A * | 8/2000 | Tsuboi | B61B 13/06 |
| | | | | 105/127 |
| 6,371,032 | B1 * | 4/2002 | Graefer | B65G 17/345 |
| | | | | 105/141 |
| 6,876,896 | B1 * | 4/2005 | Ortiz | B29C 65/02 |
| | | | | 318/135 |
| 8,827,071 | B2 * | 9/2014 | van de Loecht | B65G 54/02 |
| | | | | 198/619 |
| 9,555,720 | B2 * | 1/2017 | Aumann | B65G 54/02 |
| 9,828,179 | B2 * | 11/2017 | Prussmeier | B65G 54/02 |
| 2015/0008768 | A1 | 1/2015 | Achterberg et al. | |
| 2016/0031648 | A1 | 2/2016 | Prüssmeier et al. | |

FOREIGN PATENT DOCUMENTS

| | | |
|---|---|---|
| JP | 2000346065 A | 12/2000 |
| JP | 201316214 A | 9/2013 |
| JP | 201698846 A | 5/2016 |

* cited by examiner

TABLE CIRCULATION GUIDE DEVICE

FIELD OF THE INVENTION

The present invention relates to a table circulation guide device for a table which has sliders and carriages and which is circulated and guided along a circuit formed by straight rails and curved rails.

BACKGROUND OF THE INVENTION

Conventionally, a table circulation guide device has been used for a table on which an object such as a workpiece, equipment, etc., is mounted and which is circulated and moved along a circuit. In a working area of a straight guide passage in the middle of the circuit, operations such as machining and assembling work are performed on the object. The circuit is composed of straight guide passages and curved guide passages. In general, the straight guide passages are working areas, and the curved guide passages are non-working areas.

Japanese Patent Application Laid-Open No. 2013-176214 discloses a linear transportation device which moves an object back and forth using a linear motor. The linear transportation device includes a base, a pair of linear drive sections provided on the base, and a slider (movable member) driven by the linear drive sections. In the linear transportation device, there are provided a first circulating device for circulating the slider from the downstream end of one (forth movement side) linear drive section to the upstream end of the other (back movement side) linear drive section, and a second circulating device for circulating the slider from the downstream end of the other (back movement side) linear drive section to the upstream end of the one (forth movement side) linear drive section.

Japanese Patent Application Laid-Open No. 2000-346065 discloses a linear and curved line universal guide device which is adapted to the case where a track rail has two curved portions curved in directions different from each other. Even such a case, the guide device allows a slider to continuously move in these curved portions along the track rail. The linear and curved line universal guide device includes a track rail having a straight portion and an arc-shaped, curved portion having a predetermined radius of curvature; and a slider which has a generally saddle-shaped cross section, is disposed to straddle the track rail, and moves along the track rail as a result of rolling of a large number of balls which circulate endlessly. A load-carrying rolling groove in which the balls roll is linearly formed in the slider, and the width of the track rail at the curved portions is set to be smaller than the width of the straight portion.

U.S. Pat. No. 5,086,705 discloses a linear positioning system which comprises a carriage which moves along a track including a straight portion and a curved portion. The carriage includes a pair of roller bearings and is configured to travel along the track via the roller bearings. When the carriage moves along the curved portion of the track, the roller bearings turn along the curved portion, thereby allowing the carriage to travel along the track.

Japanese Patent Application Laid-Open No. H11-208859 discloses a conveying system which includes a travelling support body having a bogie structure which allows a carrier to change its traveling direction as a result of being guided by a guide rail on which a travel path including straight portions and curves is formed. The carrier can freely move along the travel path using external drive power. The carrier includes a pair of guide rollers which hold the guide rail from both sides; a support member for supporting the pair of guide rollers; and a bogie shaft through which the support member is pivotably supported by the carrier. When the carrier moves through a curved portion of the guide rail, the bogie shaft allows the pair of guide rollers to turn along the guide rail, so that the carrier can smoothly moves through the curved portion.

US Publication No. 2015/0008768 A1 discloses a stator device which moves an object using a linear motor. The stator device includes an electrically energizable magnetic field generator for forming a magnetic field. The magnetic field generator comprises a stator tooth, a coil wound around the stator tooth, and a holding module for holding the magnetic field generator. A first end portion of the stator tooth is fixed to a first holding device, and a second end portion of the stator tooth is fixed to a second holding device.

US Publication No. 2016/0031648 A1 discloses a conveying device which comprises a movable carriage on which track rollers are disposed, and a track rail disposed to guide the carriage. The track rail has at least one trace face, at least one straight portion, and at least one curved portion. The track rollers are configured in such a manner that during movement of the carriage along the straight portion, exclusively the track rollers of a first group roll on the track face assigned to the straight portion, and during movement of the carriage along the curved portion, exclusively the track rollers of a second group roll on the track face assigned to the curved portion.

Incidentally, the linear transportation device disclosed in Japanese Patent Application Laid-Open No. 2013-176214 is configured such that when an object is to be moved from the forth movement side to the back movement side, the object is removed from the slider on the forth movement side to and is placed on the slider on the back movement side, and is not configured to continuously circulate the object from a straight portion to a curved portion. Since a single linear guide rail is disposed only at an end portion of the slider in the widthwise direction, if a load is applied to the slider, the slider may greatly displace due to a moment in the rolling direction. Therefore, the slider cannot bear large load. Also, in the linear and curved line universal guide device disclosed in Japanese Patent Application Laid-Open No. 2000-346065, in order to allow the slider for linear guide to travel through curved portions of the track rail, the width of the curved portions of the track rail is rendered smaller, so that rolling elements roll in a state in which a clearance is formed between the track rail and the slider. Therefore, the clearance must be controlled accurately. Also, the systems disclosed in U.S. Pat. No. 5,086,705 and Japanese Patent Application Laid-Open No. H11-208859 have a problem in that since an object is moved in a state in which the object is guided by rollers only, large load cannot be borne, unlike the case where the object is guided by a linear guide.

Also, the above-described table circulation guide device may be configured such that, in a straight rail area within which a table travels through a working area which requires stability and accuracy, the table travels on straight track rails via sliders, and in a curved rail region for returning, the table travels on curved track rails via carriages. In this case, when the state of travel of the table changes from a state in which the table travels on the curved track rail via the carriages to a state in which the table travels on the straight track rails via the sliders, a large impact, resistance, etc. may act on the table. Also, if an unbalanced load is imposed on the table, an unfavorable state, such as generation of large resistance, impact, noise, etc., occurs in a boundary region where the table moves to the straight track rails on the inner and outer sides of the circuit from the curved track rail or the curved guide rails simultaneously. Also, the unbalanced load imposed on the table may adversely affects the drive apparatus. Also, due to a difference in height between the straight track rails and the curved track rails and an error involved in attachment to a bed, the table receives a large resistance, impact, etc. in a boundary region in which the table moves from the curved rail region to the straight rail region and a boundary region in which the table moves from the straight rail region to the curved rail region. Therefore, the table circulation guide device has room for improvement of the configuration for reducing the resistance, impact, etc. acting on the table.

SUMMARY OF THE INVENTION

An object of the present invention is to solve the above-described problems by providing an improved table circulation guide device which circulates and moves a table, to which sliders and carriages are attached, along a circuit whose straight portions are formed by straight rails and whose curved portions are formed by curved rails, whereby an object, such as a workpiece, a member, equipment, mounted on the table is continuously moved along the circuit. The improved table circulation guide device eliminates the necessity of performing a high degree of accuracy control for the sliders, the carriages, the straight rails, and the curved rails, and can bear large load. In the improved table circulation guide device, in order to guide the circulation of the table along the circuit, the straight portions of the circuit where various types of operations are performed on the object are formed by straight track rails of a pair of sets of straight rails, and the curved portions of the circuit where no operation is performed are formed by curved track rails. At the straight portions where various types of operations are performed, the table travels, via the sliders provided on the table, on the straight track rails which can bear large load. At the curved portions where no operation is performed, the table travels on the curved track rails via the carriages provided on the table. Thus, the object disposed on the table is continuously circulated. Namely, in the improved table circulation guide device, since the table travels on the pair of straight guide rails, the amount of deviation of the table can be reduced, and the applied load can be supported reliably and stably, whereby various types of operations (e.g., cutting of a workpiece, assembly of components, etc.) performed on the object mounted on the table can be performed accurately.

Furthermore, in this improved table circulation guide device, in each of transition regions where the table moves from the straight portion to the curved portion of the circuit or from the curved portion to the straight portion, opposite ends of the inner-side straight track rail are offset in the travelling direction from opposite ends of the outer-side straight track rail, whereby a region in which the taper portion of the slider on the inner side engages with the inner-side straight track rail and a region in which the taper portion of the slider on the outer side engages with the outer-side straight track rail are prevented from overlapping, whereby the impact caused by the transition of the table can be distributed and the table can smoothly move between the straight portion and the curved portion of the circuit. For example, in the case where the table moves from the curved portion toward the straight portion, the slider on the inner side first reaches a tapered portion of the corresponding end portion of the inner-side straight track rail so that the traveling of the table on the inner-side straight track rail starts, and then the slider on the outer side reaches a tapered portion of the corresponding end portion of the outer-side straight track rail so that the traveling of the table on the outer-side straight track rail starts. Simultaneously with this, the rollers of the carriages disengage from the curved track rail. Since the slider on the inner side first starts the travelling on the straight track rail, the inclination of the table toward the outer side where the load acting on the table is large is corrected, and the impact on the table is reduced.

Means to Solve the Problems

The present invention relates to a table circulation guide device which comprises a bed; a circuit composed of a pair of sets of straight rails fixedly disposed in linear motion guide regions which are working areas on the bed and a pair of sets of curved rails fixedly disposed in curved motion guide regions which are non-working areas on the bed; and a table which circulates and moves along the circuit. The sets of straight rails each include at least one pair of straight track rails which are disposed in parallel to each other such that the straight track rails are located on inner and outer sides of the circuit and extend in a traveling direction, and the sets of curved rails each include at least a single curved track rail, one of the curved track rails of the sets of curved rails extending from points between first end portions of the inner-side and outer-side straight track rails, and the other curved track rail extending from points between second end portions of the inner-side and outer-side straight track rails. The circuit is an endless circulation circuit which is formed by the inner-side and outer-side straight track rails and the curved track rails and along which the table can circulate and move. A plurality of sliders and a pair of carriages are attached to an under surface of the table, wherein the sliders are disposed on opposite sides of the table in a widthwise direction of the table, straddle the inner-side and outer-side straight track rails, respectively, and slide on the inner-side and outer-side straight track rails, respectively, and wherein the pair of carriages are disposed between the sliders to be located at forward and rear positions in the traveling direction and travels on the curved track rails.

Each of the sliders includes a casing which has second raceway grooves respectively facing first raceway grooves formed on opposite side surfaces of the corresponding straight track rail and return passages extending along the second raceway grooves; end caps which are disposed on opposite end faces of the casing and which have arc-shaped traveling direction changing passages which establish communication between the return passages and load-carrying races formed between the first raceway grooves and the second raceway grooves; and rolling elements which roll in circulating passages each composed of the load-carrying race, the return passage, and a pair of the traveling direction changing passages.

Each of the carriages includes a connecting plate which is rotatably attached to the table via a turning bearing; and a pair of rollers which are rotatably attached to the connecting plate such that they are spaced from each other in a widthwise direction of the connecting plate. The rollers have respective engaging grooves through which the rollers are rotatably and slidably supported by wedge shaped projection portions provided on opposite side surfaces of the curved track rail and extending in a longitudinal direction. The turning bearing is a cross roller bearing which includes an outer ring fixed to one of the table and the connecting plate, an inner ring fixed to the other of the table and the connecting plate, and cylindrical rollers which roll between a raceway surface of the outer ring and a raceway surface of the inner ring.

The circuit includes two pairs of the inner-side and outer-side straight track rails which extend straight on the bed; straight guide rails each of which is disposed between a pair of the inner-side and outer-side straight track rails to extend therealong and on which the carriages travel; two pairs of inner-side and outer-side curved guide rails on which the sliders slide, one pair of the inner-side and outer-side curved guide rails being connected to the first end portions of the inner-side and outer-side straight track rails, respectively, and the other pair of the inner-side and outer-side curved guide rails being connected to the second end portions of the inner-side and outer-side straight track rails, respectively; and the curved track rails on which the carriages travel, one of the curved track rails being connected to first end portions of the straight guide rails, and the other of the curved track rails being connected to second end portions of the straight guide rails.

Alternatively, the circuit includes first and second pairs of the inner-side and outer-side straight track rails which extend straight on the bed; straight guide rails each of which is one of the straight rails and is disposed between a pair of the inner-side and outer-side straight track rails; and a pair of the curved track rails, one of the curved track rails extending from a point between the first end portions of the inner-side and outer-side straight track rails in the first straight track rail pair and a point between the first end portions of the inner-side and outer-side straight track rails in the second straight track rail pair, and the other curved track rail extending from a point between the second end portions of the inner-side and outer-side straight track rails in the first straight track rail pair and a point between the second end portions of the inner-side and outer-side straight track rails in the second straight track rail pair.

Alternatively, the circuit includes first and second pairs of the inner-side and outer-side straight track rails which extend straight on the bed; straight guide rails each of which is one of the straight rails and is disposed between a pair of the inner-side and outer-side straight track rails; first and second pairs of tapered guide rails, one of the first pair of tapered guide rails being disposed between the first end portions of the inner-side and outer-side straight track rails in the first straight track rail pair, the other of the first pair of tapered guide rails being disposed between the first end portions of the inner-side and outer-side straight track rails in the second straight track rail pair, one of the second pair of tapered guide rails being disposed between the second end portions of the inner-side and outer-side straight track rails in the first straight track rail pair, the other of the second pair of tapered guide rails being disposed between the second end portions of the inner-side and outer-side straight track rails in the second straight track rail pair; and a pair of the curved track rails, one of the curved track rails being connected to the first pair of tapered guide rails, and the other of the curved track rails being connected to the second pair of tapered guide rails.

The inner-side and outer-side curved guide rails are disposed on the inner and outer sides of the curved track rails and are connected to the corresponding end portions of the inner-side and outer-side straight track rails through first rail connecting portions; and the straight guide rails are each disposed between the corresponding inner-side and outer-side straight track rails and are connected to opposite end portions of the curved track rails through second rail connecting portions.

In this table circulation guide device, first clearances are formed between each of the curved guide rails and the second raceway grooves of the casing of each slider, and second clearances are formed between the wedge shaped projection portions of each of the straight guide rails and the engaging grooves of the rollers of each of the carriages.

In each of the first rail connecting portions through which the straight track rails are connected to the curved guide rails, the corresponding end portion of the corresponding straight track rail is tapered such that the straight track rail is narrowed gradually, whereby the size of clearances between the straight track rail and the second raceway groove of the casing of the slider increases gradually and becomes approximately equal to that of the first clearances; when the slider reaches each of the end portions of the straight track rail, due to the clearances, the rolling elements enter a free state; and then the slider is guided to the curved guide rail.

Inn each of the second rail connecting portions through which the curved track rails are connected to the straight guide rails, the wedge shaped projection portions of the corresponding end portion of the corresponding straight guide rail is tapered such that the thickness of the wedge shaped projection portions increases toward the corresponding curved track rail, whereby the size of the second clearances between the wedge shaped projection portions of each of the straight guide rails and the engaging grooves of the rollers of each of the carriages decreases gradually; at each of the opposite end portions of the straight guide rail, the clearances between the wedge shaped projection portions of the straight guide rail and the engaging grooves of the rollers of the carriage disappear; the wedge shaped projection portions of the curved track rail engage with the engaging grooves of the rollers of the carriage; and the carriage travels on the curved track rail while being guided by the curved track rail.

In this table circulation guide device, shims for height adjustment are disposed between a top surface of the bed and the lower surfaces of the straight track rails which support the sliders; and each of the curved guide rails has an arc-shaped base portion having a height corresponding to the height of the shims, and an arc-shaped guide portion which protrudes from an upper surface of the arc-shaped base portion into a space between the raceway grooves of the casing of the slider and which is smaller in width than the straight track rail.

In this table circulation guide device, the carriages which slide on the curved track rails are attached to the under surface of the table such that the carriages are spaced from each other in the traveling direction of the table; and the sliders which slide on the straight track rails are attached to the under surface of the table such that the slides are spaced from each other in the widthwise direction of the table or such that the slides are spaced from each other in the traveling direction of the table and in the widthwise direction of the table.

Each of the carriages is configured such that, in order to shorten a distance between the axes of the rollers, rotation support shafts of the rollers are offset in the traveling direction from the rotation shaft of the turning bearing by a predetermined distance; the carriages are attached to the under surface of the table such that the carriages are spaced from each other in the traveling direction of the table; and in order to prevent the connecting plates of the carriages from colliding with each other, the connecting plates of the carriages have notches for interference preventions, the notches for interference preventions being formed by cutting side portions of the connecting plates, which side portions face each other.

The bed having the endless circulation circuit formed thereon is disposed on a stand; the table is circulated and transported on the circuit by a linear-motor-type transport system; the endless circulation circuit includes first and second pairs of the inner-side and outer-side straight track rails, and a pair of the curved track rails, one of the curved track rails extending from a point between the first end portions of the inner-side and outer-side straight track rails in the first straight track rail pair and a point between the first end portions of the inner-side and outer-side straight track rails in the second straight track rail pair, and the other curved track rail extending from a point between the second end portions of the inner-side and outer-side straight track rails in the first straight track rail pair and a point between the second end portions of the inner-side and outer-side straight track rails in the second straight track rail pair; and the inner-side and outer-side straight track rails are disposed on the bed such that each of opposite end faces of the outer-side straight track rail in each straight track rail pair is offset in the traveling direction from the corresponding end face of the inner-side straight track rail in the same straight track rail pair.

Furthermore, the end portions of each of the straight track rails is tapered; and the inner-side and outer-side straight track rails in each straight track rail pair have different lengths.

The linear-motor-type transport system includes:

a movable-magnet-type linear motor composed of a field magnet disposed on the table and an armature assembly disposed on the bed; and a position detection system composed of a position detection sensor disposed on the field magnet on the bed and a linear scale disposed along the armature assembly on the bed.

The table is tapered such that the width of the table in the traveling direction decreases toward the inner side of the circuit; the sliders attached to the table includes two sliders provided for the outer-side straight track rail of the circuit such that the two sliders are spaced from each other in the traveling direction and a single slider provided for the inner-side straight track rail of the circuit; and the timing at which the slider on the inner side passes through one end face of the inner-side straight track rail differs from the timing at which the slider on the outer side passes through the corresponding end face of the outer-side straight track rail.

Effects of the Invention

Since the table circulation guide device according to the present invention is configured as described above, an endless circulation circuit is composed of at least a pair of straight track rails and curved track rails disposed adjacent to the opposite end portions of the straight track rails, and the table can circulate and move along the endless circulation circuit. Specifically, when the table travels in working areas on the straight track rails, the table can travel along the straight track rails via at least a pair of sliders traveling on the straight track rails, respectively, and when the table travels in non-working areas on the curved track rails, the table can travel along the curved track rails via carriages attached to the table. As described above, the table circulation guide device can circulate and move the table, to which the sliders and the carriages are attached, along the circuit whose straight portions are formed by the straight rails and whose curved portions are formed by the curved rails, whereby an object, such as a workpiece, a member, equipment, etc., mounted on the table is continuously moved along the circuit.

In addition, the table circulation guide device eliminates the necessity of performing a high degree of accuracy control for the table having the sliders and the carriages attached thereto, and the circuit composed of the straight rails and the curved rails, large load can be applied to the table, and stable and smooth travel of the table is enabled. In order to minimize the number of rails of the circuit, the straight portions of the circuit where various types of operations are performed are each formed by a pair of straight track rails, and the curved portions of the circuit are each formed by a single curved track rail for circulating and guiding the table. Therefore, the apparatus can be made simple, and the table on which the object is mounted can be continuously circulated along the circuit. The table circulation guide device is configured such that, in each of the straight portions where various types of operations are performed, the table is guided y a pair of straight track rails. Therefore, the load which can be imposed on the table can be increased. In addition, at opposite end portions of the table in the widthwise direction thereof, straight guide rails are disposed as straight track rails such that they are parallel to each other; i.e., are parallel to the longitudinal direction, and the table travels on the straight track rails. Therefore, the amount of deviation of the table can be minimized, and the load imposed on the table can be supported reliably and stably, whereby various types of operations (e.g., machining such as cutting performed on a workpiece, assembly operation, etc.) on an object mounted on the table can be performed reliably and accurately.

Furthermore, in this table circulation guide device, the straight track rail on the outer side of the circuit and the straight track rail on the inner side of the circuit are disposed on the bed in such a manner that the opposite end faces of the outer-side straight track rail are offset from the opposite end faces of the inner-side straight track rail in the traveling direction. Therefore, the positions of the tapered portions of the end portions of the inner-side straight track rail differ from the positions of the tapered portions of the end portions of the outer-side straight track rail. Thus, a region in which the end face of the slider on the inner side reaches the inner-side straight track rail and a region in which the slider on the outer side reaches the outer-side straight track rail are prevented from overlapping in the traveling direction. Therefore, the impact generated when the table moves from the straight rail region to the curved rail region or moves from the curved rail region to the straight rail region is dispersed to occur at two locations, whereby the travel state in the circulating circuit can be smoothly switched between a state in which the table travels while being guided by the carriages and a state in which the table travels while being guided by the sliders. Specifically, in the case where the table moves from the curved rail region toward the straight rail region, the slider on the inner side first reaches a tapered portion of the corresponding end portion of the inner-side straight track rail so that the travelling of the table on the inner-side straight track rail is started, and then the slider on the outer side reaches a tapered portion of the corresponding end portion of the outer-side straight track rail so that the travelling of the table on the outer-side straight track rail is started. Simultaneously with this, the rollers of the carriages disengage from the curved track rail. Also, since the sliders fixed to the table include two sliders on the outer side and a single slider on the inner side, it is possible to correct the inclination of the table toward the outer side, reduce the travel resistance of the table, impact, etc., and increase rigidity while minimizing an increase in the weight of the table. Needless to say, this table circulation guide device can achieve the same advantageous effect in the case where the inner-side straight track rail is made shorter, and the outer-side straight track rail is made longer. Namely, in this table circulation guide device, two sliders are disposed on the under surface of the table at a position on the outer side of the circuit where large load is imposed, and a single slider is disposed on the under surface of the table at a position on the inner side of the circuit where small load is imposed. Thus, the load imposed on the table is balanced, and inertial force is minimized. Further, in addition to employment of the above-described configuration of the sliders, the table is formed to have a tapered (or trapezoidal) shape such that the width of the table in the traveling direction decreases toward the inner side. Thus, the inertial force is reduced further. Furthermore, a workpiece or apparatus is disposed on the table such that the load on the outer side of the circuit and the load on the inner side of the circuit become unbalance, inclination of the table or a like problem occurs. In order to avoid occurrence of such a problem, the lengths and/or arrangements of the inner-side and the straight track rails are determined such that the slider on the inner side of the circuit first reaches a tapered portion of the corresponding end portion of the inner-side straight track rail, and then the slider on the outer side reaches a tapered portion of the corresponding end portion of the outer-side straight track rail, whereby the timing when the slider on the inner side starts to travel on the inner-side straight track rail is shifted from the timing when the slider on the outer side starts to travel on the outer-side straight track rail. Thus, the inclination of the table can be corrected, and generation of impact, etc. can be reduced. Also, in this table circulation guide device, since a movable-magnet-type linear motor is utilized as a drive source, a circulation-type transport system can be configured by connecting together modules for the straight rail regions and modules for the curved rail regions. Notably, the connection of a power cable or the like to the linear-motor-type transport system can be performed tough a wiring through hole provided in the bed.

DETAILED DESCRIPTION OF THE EMBODIMENTS

Figure 1:
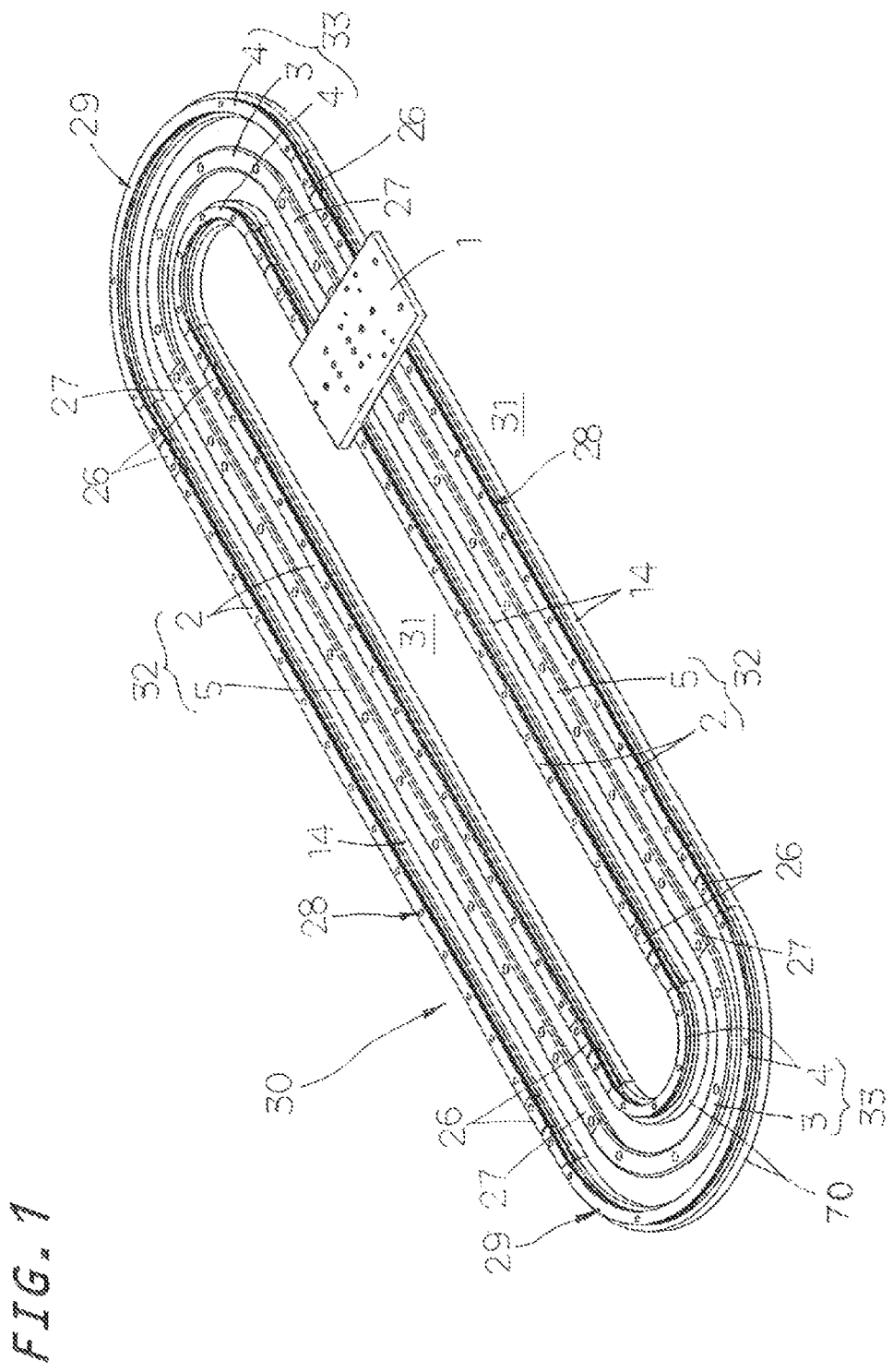
FIG. 1 is a perspective view showing a first embodiment of a table circulation guide device according to the present invention.

Embodiments of the table circulation guide device according to the present invention will now be described with reference to the drawings. This table circulation guide device can be used in a system in which any of various types of apparatuses, such as an assembling apparatus and an inspection apparatus, a workpiece, or the like is mounted on a table, and various types of operations are performed while the table is circulated through working areas and non-working areas.

First, a first embodiment of the table circulation guide device according to the present invention will be described with reference to FIGS. 1 to 12. This table circulation guide device can drive a table 1 through use of a drive means such as a linear-motor-type drive means or a belt-drive-type drive means. The table circulation guide device is composed of a bed 31, a circuit 30 on the bed 31, and the table 1 which circulates and moves while being supported by the circuit 30. The circuit 30 is composed of a plurality of straight rails 2 and 5 (which will be collectively referred to as the "straight rails 32") fixedly disposed in linear motion guide regions which are working areas 28 and a plurality of curved rails 3 and 4 (which will be collectively referred to as the "curved rails 33") fixedly disposed in curved motion guide regions which are non-working areas. The straight rails 32 include at least two pairs of straight track rails 2 which are parallel to each other, are spaced from each other, and extend in the longitudinal direction, and the curved rails 33 include a pair of curved track rails 3 which are disposed adjacent to opposite ends of the straight rails and extend to form an arc-like shape. The circuit 30 is an endless circulation circuit in which the two pairs of straight track rails 2 and the curved track rails 3 located adjacent to the opposite end portions 53 thereof allow circulating movement of the table 1.

Figure 2:
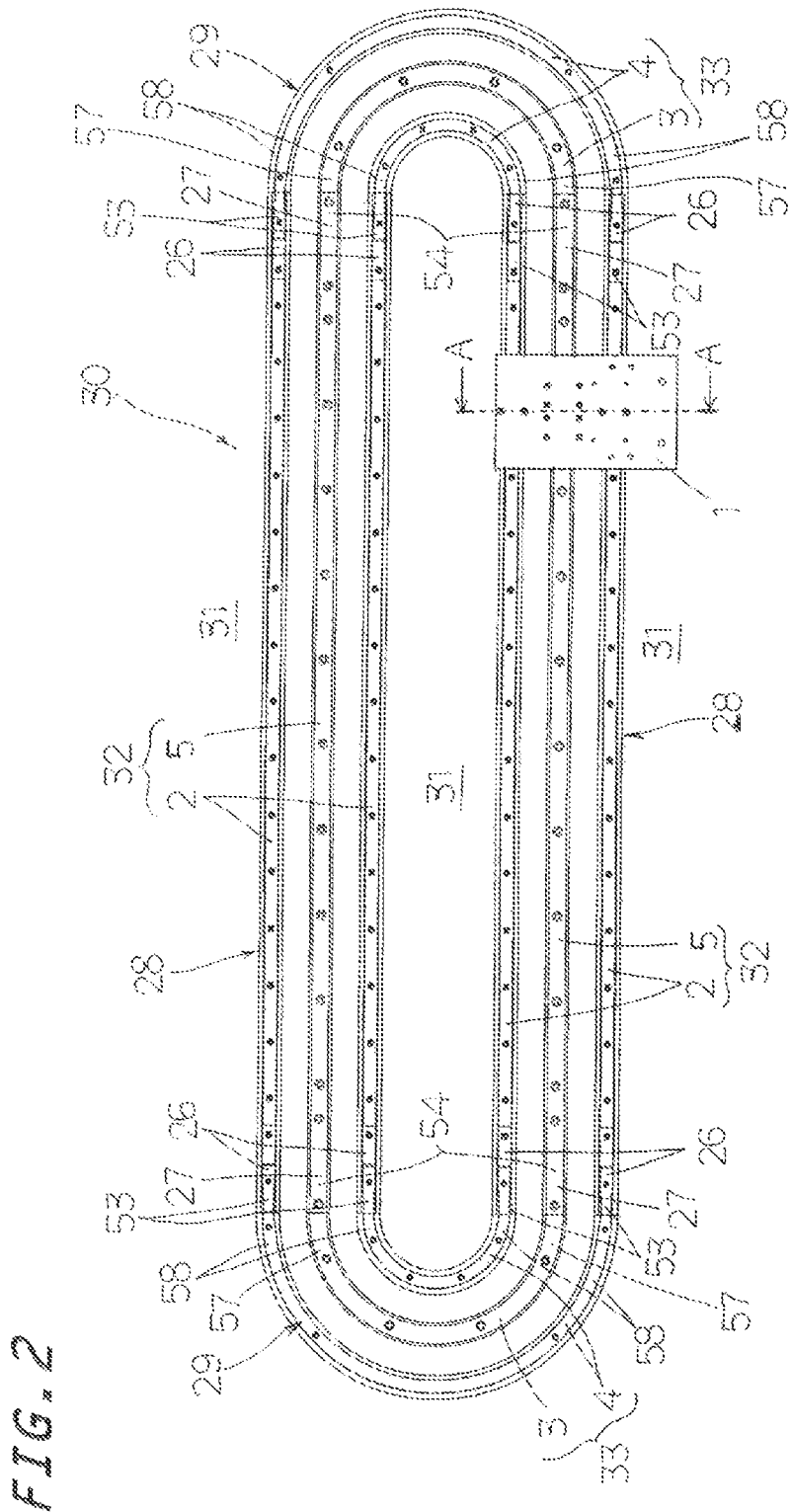
FIG. 2 is a plan view of the table circulation guide device of FIG. 1.
Figure 5:
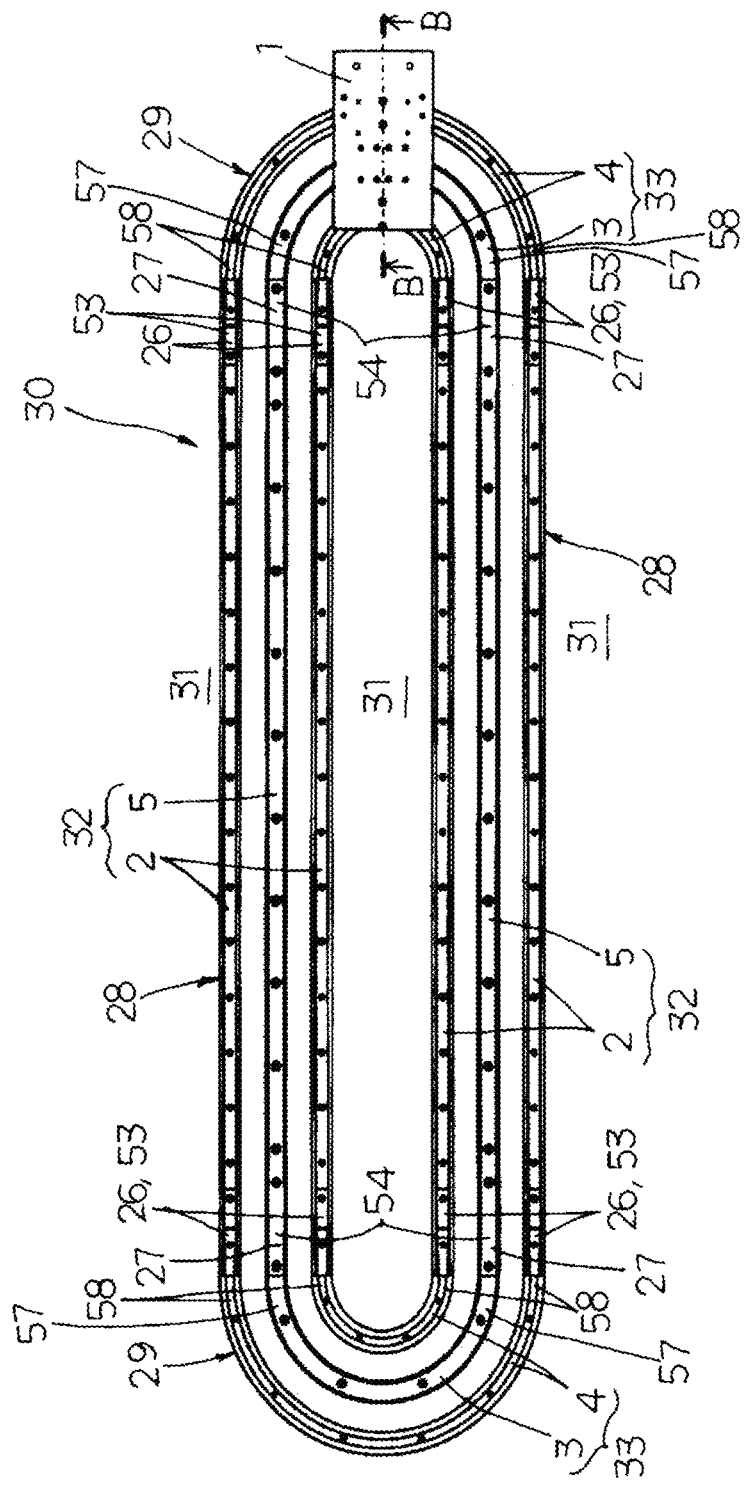
FIG. 5 is a plan view showing a state in which a table is guided on curved guide rails in the table circulation guide device of FIG. 1.

The straight rails 32 and the curved rails 33, which constitute the circuit 30, will be described with reference to FIGS. 1, 2, and 5. The circuit 30 is formed by the straight track rails 2 of the straight rails 32; the straight guide rails 5 of the straight rails 32 disposed between the respective straight track rails 2; the curved guide rails 4 of the curved rails 33 connected to the respective straight track rails 2; and the curved track rails 3 of the curved rails 33 connected to the respective straight guide rails 5. The straight track rails 2 and the straight guide rails 5 extend straight on the bed 31. In the circuit 30, two pairs of straight track rails 2 extending parallel to each other are disposed on the bed 31. The opposite end portions 53 of the straight track rails 2 are connected to end portions 58 of the curved guide rails 4. Between each pair of straight track rails 2, a single straight guide rail 5 extends parallel to the straight track rails 2 and is disposed on the bed 31. Opposite end portions 54 of the straight guide rail 5 are connected to respective end portions 57 of the curved track rails 3. Each straight guide rail 5 has wedge shaped projection portions 46 extending in the longitudinal direction thereof. Rollers 9 of a carriage 6 which will be described later have engaging grooves 47. Clearances 44 (second clearances) are formed between the wedge shaped projection portions 46 and the engaging grooves 47. Therefore, the wedge shaped projection portions 46 are free; i.e., are not engaged with the rollers 9 of the carriage 6, so that the straight guide rail 5 does not support the load of the table 1. However, the table 1 straddles the straight guide rail 5 via the pair of rollers 9 of the carriage 6. Therefore, if the straight guide rail 5 is not provided, when the table 1 travels along the straight track rails 2, the carriage 6 may rotate. However, in the first embodiment, the straight guide rail 5 is disposed between the pair of straight track rails 2 and the pair of rollers 9 of the carriage 6 straddle the straight guide rail 5, so that the carriage 6 does not rotate. Therefore, the table 1 is smoothly guided when the carriage 6 moves from the straight guide rail 5 to the curved track rail 3.

Figure 3:
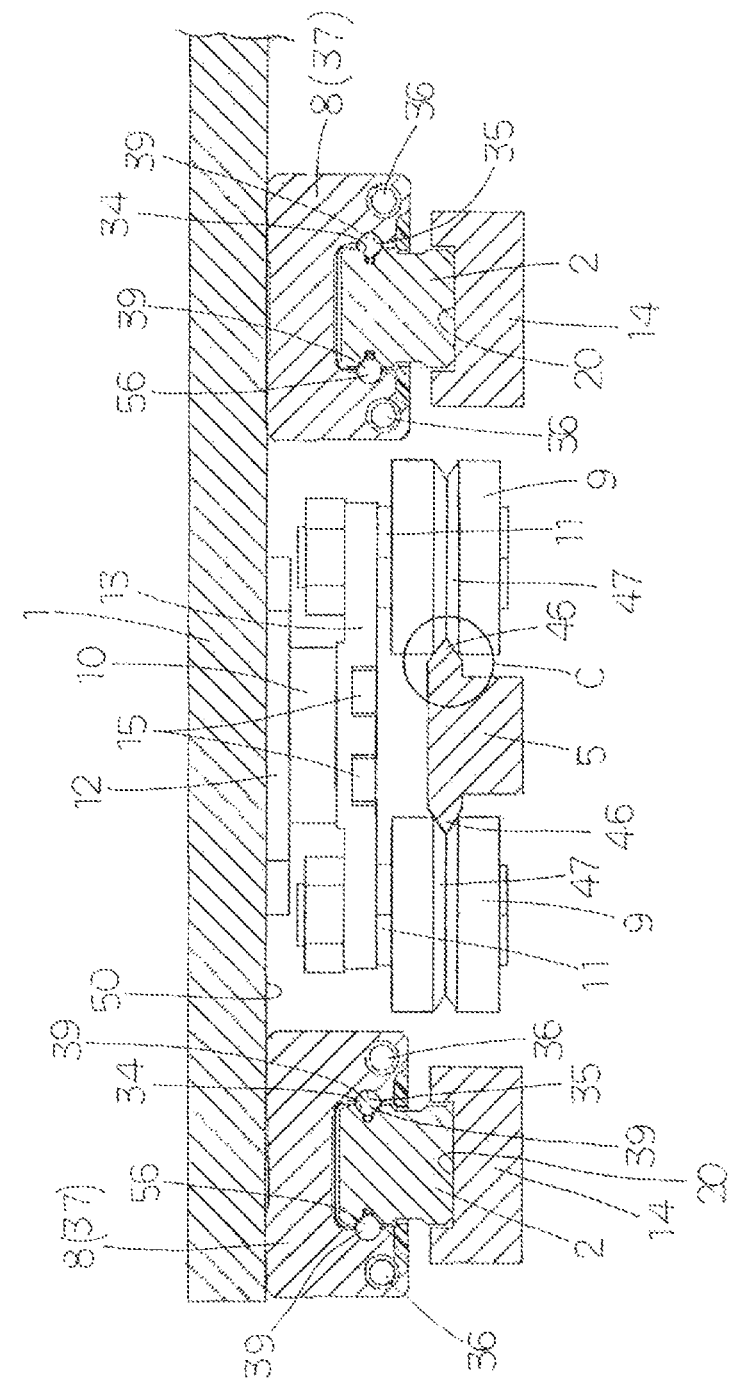
FIG. 3 is a sectional view of the table circulation guide device taken along line A-A of FIG. 2.

As shown in FIG. 3, each of sliders 8 attached to an under surface 50 of the table 1 is composed of a casing 37, end caps 48, end seals 49, and rolling elements 56. The casing 37 has raceway grooves 35 (second raceway grooves) formed to face raceway grooves 34 (first raceway grooves) formed on each of the pair of straight track rails 2, and return passages 36 extending parallel to the raceway grooves 35. The end caps 48 are disposed on opposite end faces of the casing 37 and each have arc-shaped traveling direction changing passages (not shown) which establish communication between the return passages 36 and load-carrying races 39 formed between the raceway grooves 35 of the casing 37 and the raceway grooves 34 of each straight track rail 2. The end seals 49 are attached to the end faces of the end caps 48. The rolling elements 56 roll in circulating passages each composed of the load-carrying race 39, the return passage 36, and the pair of traveling direction changing passages. In the table circulation guide device, shims 14 for height adjustment are disposed between the top surface of the bed 31 and the lower surfaces of the straight track rails 2, which support the sliders 8 fixed to the under surface 50 of the table 1. A linear motion guide unit composed of the slider 8 and the straight track rail 2 has a predetermined height. In view of this, in the table circulation guide device, in order to attach the carriage 6 to the under surface 50 of the table 1; i.e., in order to secure a space for disposing the carriage 6 under the table 1, the height of the circuit 30 is adjusted by disposing the shims 14 under the straight track rails 2, the shims 14 being adjustment members for height adjustment. Each shim 14 has a longitudinally extending groove 20 for receiving the straight track rail 2, and the bottom surface of the groove 20 forms an attachment surface for the straight track rail 2. The casing 37 of each slider 8 has the raceway grooves 35, which face the raceway grooves 34 formed on opposite side surfaces of each straight track rail 2. The raceway groove 34 and the raceway groove 35 form the load-carrying race 39, and the rolling elements 56 roll in the load-carrying race 39 without clearance, whereby the table 1 fixed to the sliders 8 travels while being supported on the straight track rails 2. Each curved guide rail 4 has an arc-shaped base portion 70 which has a height corresponding to the height of each shim 14, and an arc-shaped guide portion 69 which protrudes from the upper surface of the arc-shaped base portion 70 and extends into a space between the raceway grooves 35 of the casing 37 of the corresponding slider 8, and has a width smaller than that of each straight track rail 2. The arc-shaped guide portion 69 and the arc-shaped base portion 70 are integrally formed.

Figure 4:
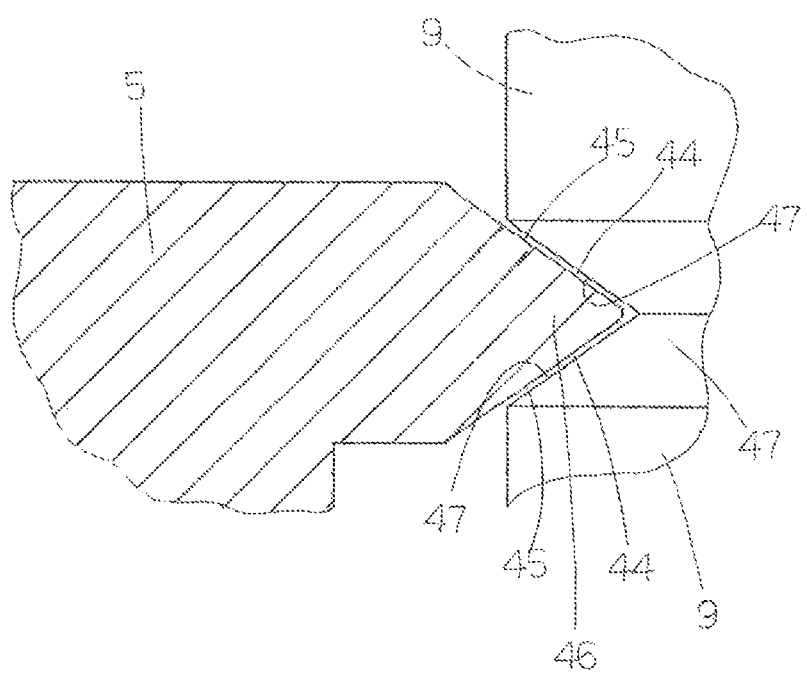
FIG. 4 is an enlarged sectional view showing a region of FIG. 3 indicated by symbol C.
Figure 6:
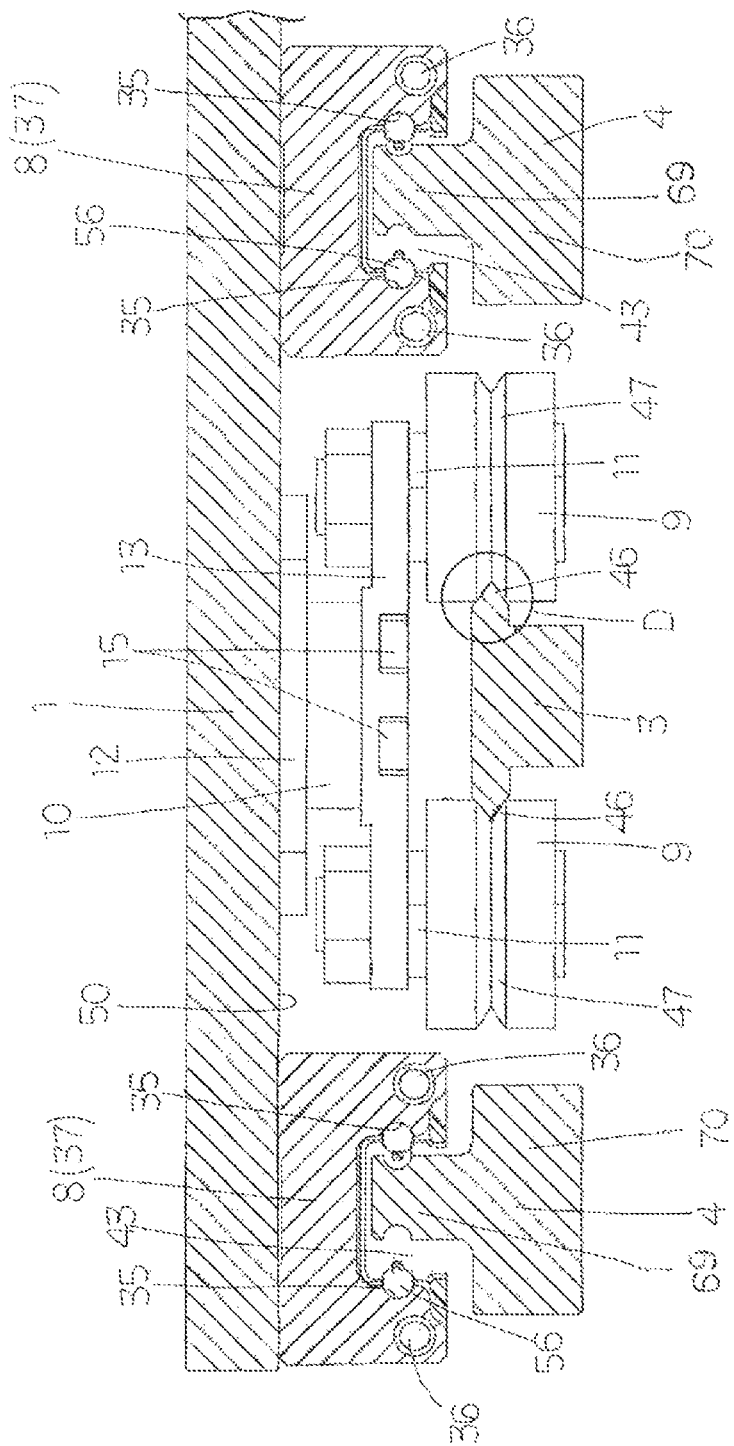
FIG. 6 is a sectional view of the table circulation guide device taken along line B-B of FIG. 5.
Figure 7:
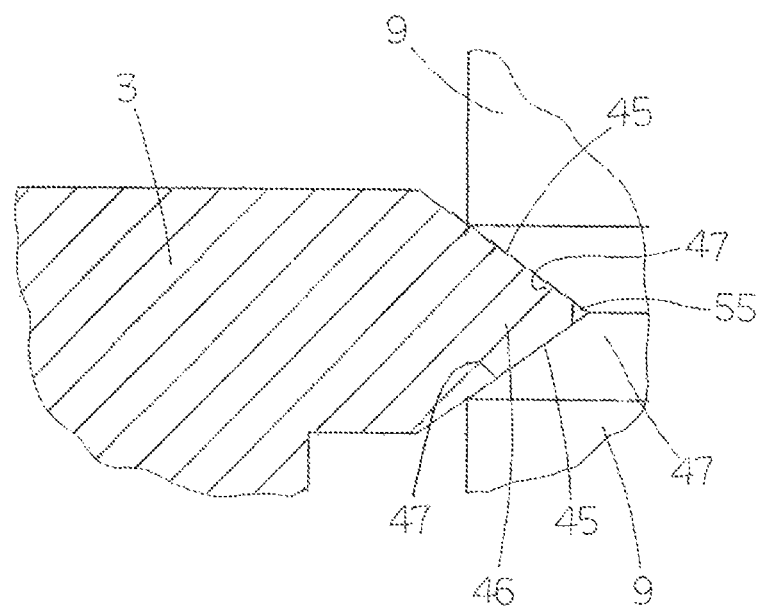
FIG. 7 is an enlarged sectional view showing a region of FIG. 6 indicated by symbol D.
Figure 11:
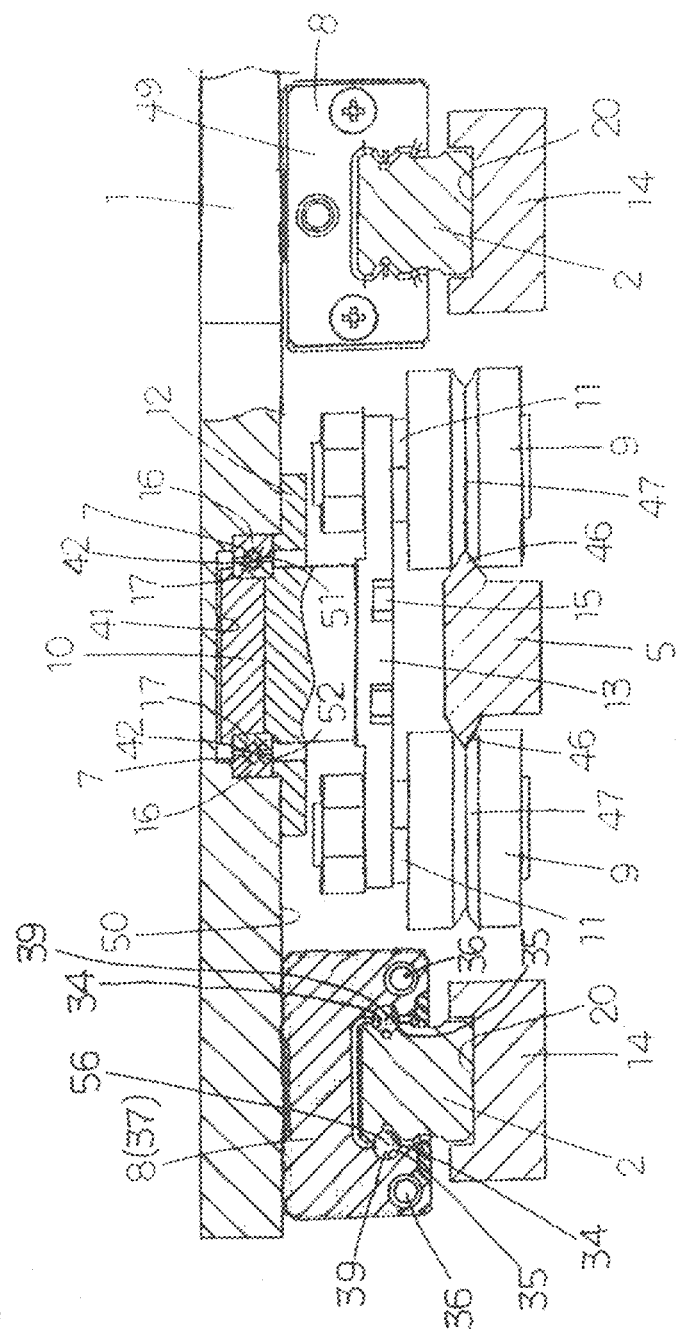
FIG. 11 is a partial sectional view of the table circulation guide device corresponding to FIG. 3 and showing a state in which a table having sliders and carriages is located in a straight rail region.
Figure 12:
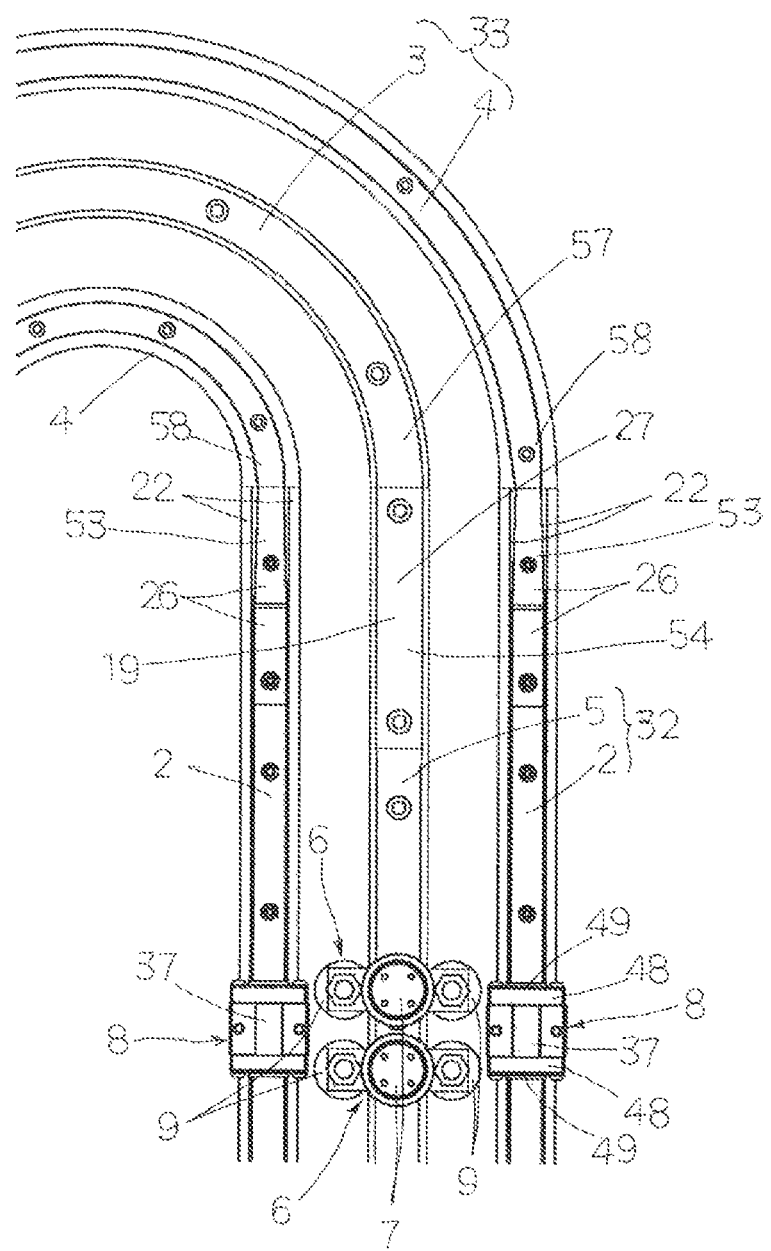
FIG. 12 is a plan view showing a state in which straight track rails are connected to curved guide rails, and straight guide rails are connected to curved track rails.

As shown in FIG. 12, the carriages 6 attached to the under surface 50 of the table 1 are spaced from each other in the traveling direction of the table 1. Each carriage 6 is rotatably attached to the table 1 via a turning bearing (cross roller bearing) 7 incorporated therein. Specifically, as shown in FIGS. 3, 6, and 11, each carriage 6 is composed of a connecting plate 13 attached to a rotation shaft 10 of the turning bearing 7 with set screws 15, and a pair of rollers 9 which are rotatably attached to rotation support shafts 11 attached to the connecting plate 13 such that the support shafts 11 are spaced from each other in the widthwise direction. The rollers 9 have engaging grooves 47 which are grooves each having a V-shaped cross section and extending in the circumferential direction. Through the engaging grooves 47, the rollers 9 are rotatably and slidably engaged with the wedge shaped projection portions 46, which are provided on the opposite sides of each curved track rail 3 and extend in the longitudinal direction. Each of the wedge shaped projection portions 46 of each curved track rail 3 has a pair of inclined planes 45 intersecting each other, and has a flat surface 55 at its apex. In contrast, as shown in FIG. 4, each of the wedge shaped projection portions 46 of each straight guide rail 5 has a pair of inclined planes 45 intersecting with each other, and the flat surface 55 at its apex disappears in the region of a taper 23 of each end portion 54; i.e., the thickness of each wedge shaped projection portion 46 decreases so that the wedge shaped projection portion 46 has a sharp end. When the carriage 6 travels on the curved track rail 3, as shown in FIG. 7, the carriage 6 travels in a state in which the wedge shaped projection portions 46 of the curved track rail 3 each extending in the longitudinal direction and having the flat surface 55 at its apex is in sliding engagement with the engaging grooves 47 of the rollers 9 with no clearance formed therebetween. Each turning bearing 7 is a cross roller bearing which is composed of an outer ring 16 fixedly fitted into a recess 41 formed on the under surface 50 of the table 1; an inner ring 17 fixed to the outer circumferential surface of the rotation shaft 10; and cylindrical rollers 42 rolling between a raceway surface 51 of the outer ring 16 and a raceway surface 52 of the inner ring 17. The rotation shaft 10 to which the inner ring 17 is fixed is attached to the connecting plate 13 with the set screws 15. As shown in FIG. 4, a clearance 44 of a predetermined size is formed between the straight guide rail 5 and the engaging groove 47 of each roller 9 of the carriage 6 so as to prevent the straight guide rail 5 from generating frictional resistance against the movement of the table 1 which is moved along the straight guide rail 5.

Two curved guide rails 4 are disposed on opposite sides of each curved track rail 3 and are connected to the corresponding end portions 53 of the straight track rails 2 through rail connecting portions 26 (first rail connecting portions). As shown in FIG. 6, each curved guide rail 4 has the arc-shaped base portion 70 fixed to the bed 31, and the arc-shaped guide portion 69 integrally formed on the arc-shaped base portion 70. The arc-shaped guide portion 69 has raceway grooves 35 equivalent to the raceway grooves 35 formed on each straight track rail 2. In this table circulation guide device, clearances 43 (first clearances) of a predetermined size are formed between the raceway grooves 35 of the arc-shaped guide portion 69 of each curved guide rail 4 and the raceway grooves 35 of the casing 37 of the corresponding one of the sliders 8 so as to prevent the sliders 8 from generating frictional resistance against the movement of the table 1 which is moved along the curved track rail 3. At each rail connecting portion 26 where the corresponding end portion 53 of the corresponding straight track rail 2 and the corresponding end portion 58 of the corresponding curved guide rail 4 are connected to each other, the end portion 53 of the straight track rail 2 is tapered such that the straight track rail 2 becomes narrow gradually, thereby forming a taper 22. As a result, the size of the clearances between the raceway grooves 35 of the straight track rail 2 and the raceway grooves 35 of the casing 37 of the slider 8 increases gradually, whereby the size of the clearances becomes equal to the size of the clearances 43. Due to the clearances, the rolling elements 56 of the slider 8 enter a free state at the opposite ends of the straight track rail 2 and the table 1 is smoothly guided to the corresponding curved track rail 3. Namely, in this table circulation guide device, at each rail connecting portion 26 where the corresponding end portion 53 of the corresponding straight track rail 2 and the corresponding end portion 58 of the corresponding curved guide rail 4 are connected to each other, the end portion 53 of the straight track rail 2 is tapered such that the straight track rail 2 becomes narrow gradually, thereby forming a taper 22. As a result, the size of the clearances between the raceway grooves 35 of the straight track rail 2 and the raceway grooves 35 of the casing 37 of the slider 8 increases gradually, whereby the size of the clearances becomes substantially the same as the size of the clearances 43. Due to the clearances, the rolling elements 56 of the slider 8 enter a free state at the opposite ends of the straight track rail 2 and are smoothly guided to the corresponding curved guide rail 4. In this table circulation guide device, since the curved guide rails 4 are connected to the straight track rails 2, when some external force acts on the table 1 and the table 1 travels from the straight track rails 2 to a curved portion of the circuit 30, the sliders 8 move to the curved guide rails 4. Therefore, coming off of the rolling elements 56 from the sliders 8 is prevented. Also, since the load of the table 1 does not act on the curved guide rails 4, the curved guide rails 4 can be formed of, for example, a resin or a metal of low strength.

The table circulation guide device is characterized in that, when the table 1 travels in the working area 28 on each pair of the straight track rails 2, the table 1 is supported by the straight track rails 2 via at least one pair of the sliders 8 travelling on the straight track rails 2, and that, when the table 1 travels in the non-working area 29 on each curved track rail 3, the table 1 is supported by the curved track rail 3 via the pair of carriages 6 which are located between the sliders 8 attached to the table 1 and are spaced from each other in the traveling direction. Namely, in the case where this table circulation guide device is configured such that the rollers 9 of the carriages 6 and the sliders 8 provide their guiding functions simultaneously, the following phenomenon may occur. Specifically, for example, when the vertical positions of the sliders 8 and the rollers 9 deviate from their predetermined positions, the sliders 8 and the rollers 9 interfere; i.e., produce forces in opposite directions in the vertical direction, and fail to smoothly guide the table 1. In view of this, this table circulation guide device is configured such that in the region of the straight rails 32 in the circuit 30, the table 1 moves back and forth along the straight track rails 2 via the sliders 8, and in the region of the curved rails 33 in the circuit 30, the table 1 moves back and forth along the curved track rail 3 via the carriages 6.

In this table circulation guide device, when the table 1 travels on the curved rails 33, the sliders 8 each serving as a linear motion guide unit, travel along the curved guide rails 4 connected to the straight track rails 2. When the table 1 travels on the curved rails 33, each of the sliders 8 fixed to the table 1 travels along the arc-shaped guide portion 69 of the corresponding curved guide rail 4 while straddling the arc-shaped guide portion 69. At that time, in the widthwise direction of the curved rails 33, the above-mentioned clearances 43 are formed between the raceway grooves 35 of the slider 8 and the arc-shaped guide portion 69 of the curved guide rail 4. Accordingly, when the sliders 8 travel along the curved guide rails 4, the sliders 8 are not restricted by the curved guide rails 4, and the sliders 8 are not involved in the travel of the table 1. Also, since the clearances 43 are present between the raceway grooves 35 of the slider 8 and the arc-shaped guide portion 69, the slider 8 must be a slider of a type which includes a retaining member for retaining the rolling elements 56 on the casing 37, thereby preventing coming off of the rolling elements 56 from the raceway grooves 35 of the casing 37. In the embodiment shown in FIGS. 1, 2, and 5, the number of the sliders 8 attached to the under surface 50 of the table 1 is two; i.e., only one slider 8 is used for each straight track rail 2. Thus, the number of the sliders 8 used is minimized. Therefore, the weight of the table 1 including the sliders 8 can be reduced, and the inertial of the table 1 can be reduced. Although a ball-type slider or a roller-type slider can be used for the sliders 8, use of a ball-type slider is preferred because use of a roller-type slider causes the following problem. When the roller-type slider 8 fixed to the table 1 is engaged with a rail, the rollers (rolling elements) of the roller-type slider 8 may fall down.

Each straight guide rail 5 is disposed between the paired straight track rails 2 and is connected to the corresponding end portions 57 of the curved track rail 3 through rail connecting portions 27 (second rail connecting portions). In the rail connecting portions 27 for connecting the end portions 57 of the curved track rails 3 to the end portions 54 of the straight guide rails 5, each of the wedge shaped projection portions 46 provided on the opposite sides of the opposite end portions 54 of each straight guide rail 5 and extending in the longitudinal direction has a taper 23; i.e., each of the wedge shaped projection portions 46 is tapered such that its thickness increases gradually from the straight side G toward the curved track rail 3 on the curve side F (see FIG. 19). As a result, at the end portions 54 of the straight guide rail 5, the state of the sliding engagement of the wedge shaped projection portions 46 with the engaging grooves 47 changes as follows. The size of the clearances 44 between the straight guide rail 5 and the engaging grooves 47 of the rollers 9 of each carriage 6 decreases gradually, and the clearances 44 disappear at each of opposite ends of the straight guide rail 5. Subsequently, the wedge shaped projection portions 46 of the curved track rail 3 come into sliding engagement with the engaging grooves 47 of the rollers 9 of each carriage 6. In this table circulation guide device, in each of the rail connecting portions 27 where the curved track rails 3 are connected to the straight guide rails 5, each of the wedge shaped projection portions 46 provided on the opposite sides of the opposite end portions 54 of each straight guide rail 5 has the taper 23; i.e., each of the wedge shaped projection portions 46 is tapered such that its thickness increases gradually from the straight side G toward the curved track rail 3 on the curve side F (see FIG. 19). As a result, the size of the clearances 44 between the straight guide rail 5 and the engaging grooves 47 of the rollers 9 of each carriage 6 decreases gradually, and the clearances 44 disappear at each of opposite ends of the straight guide rail 5. Subsequently, the wedge shaped projection portions 46 of the curved track rail 3 are fitted into the engaging grooves 47 of the rollers 9 of each carriage 6, whereby the carriage 6 is guided by the curved track rail 3 and travels smoothly. In other words, in areas where the inclined planes 45 of each wedge shaped projection portion 46 constitute a raceway surface, the wedge shaped projection portion 46 has the flat surface 55 at its apex as shown in FIG. 7. As the thickness of the wedge shaped projection portion 46 decreases gradually as a result of tapering, the area of the flat surface 55 becomes zero as shown in FIG. 4, so that the apex of the wedge shaped projection portion 46 has a sharpened shape. Namely, the shape of the wedge shaped projection portions 46 of the curved track rail 3 changes and becomes approximately the same as the shape of the wedge shaped projection portions 46 of the straight guide rail 5. Therefore, when the sliders 8 travel on the straight track rails 2, the wedge shaped projection portions 46 do not resist the traveling of the table 1. In each working area 28, the sliders 8 travel on the straight track rails 2 with no clearance formed therebetween, and the table 1 travels on the straight track rails 2 via the sliders 8. Therefore, even when a large load is imposed on the table 1, an object on the table 1 to be conveyed can be conveyed smoothly and accurately.

Figure 8:
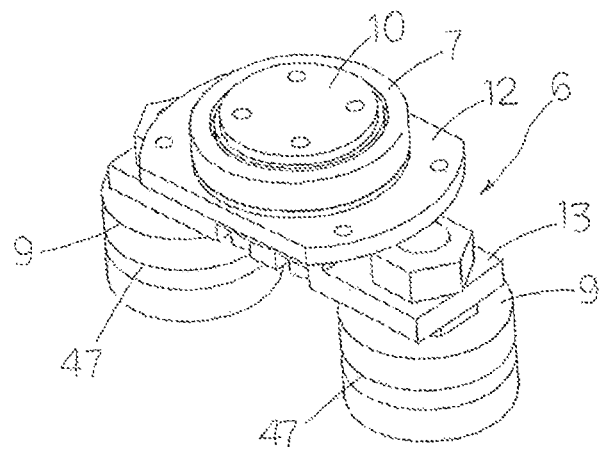
FIG. 8 is a perspective view showing one embodiment of a carriage provided on a table in the table circulation guide device.
Figure 9:
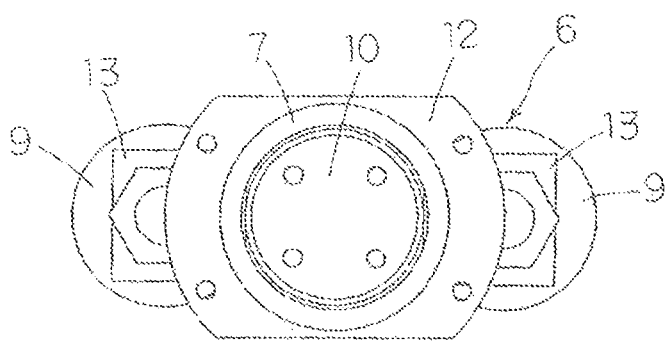
FIG. 9 is a plan view of the carriage of FIG. 8.
Figure 10:
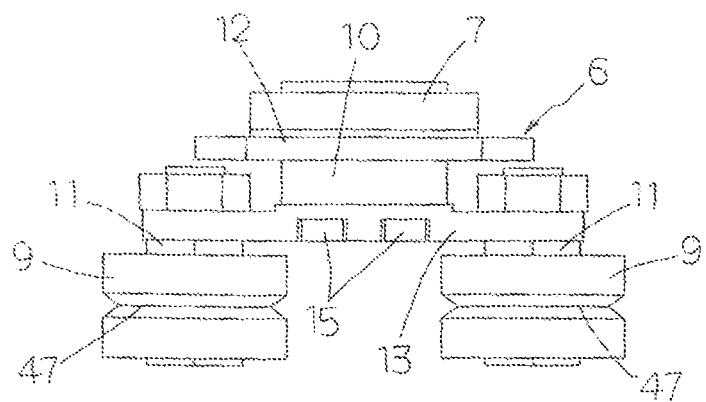
FIG. 10 is a front view of the carriage of FIG. 8.
Figure 13:
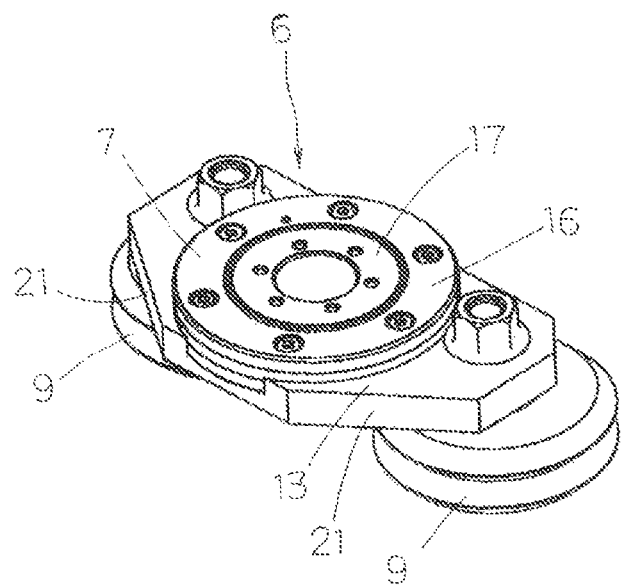
FIG. 13 is a perspective view showing another embodiment of the carriage provided on the table in the table circulation guide device.
Figure 14:
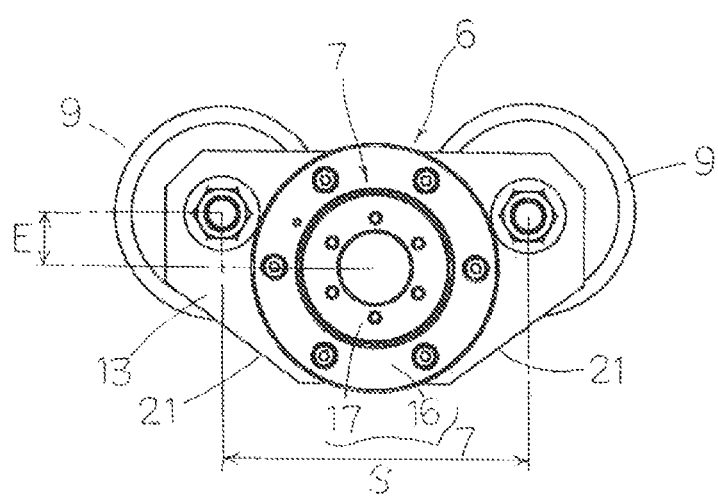
FIG. 14 is a plan view of the carriage of FIG. 13.
Figure 15:
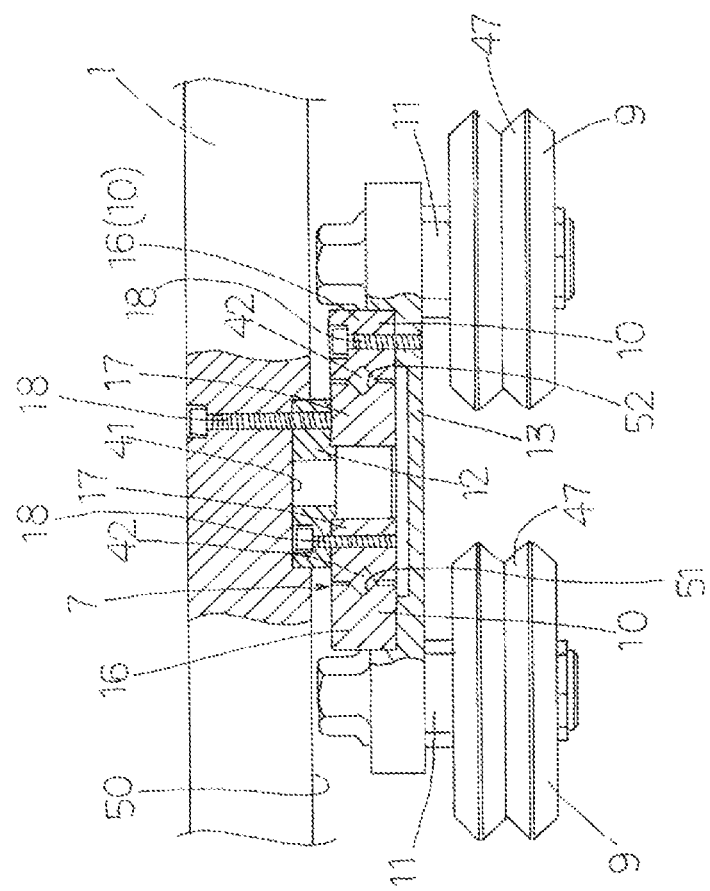
FIG. 15 is a partially sectioned front view of the carriage of FIG. 13.
Figure 16:
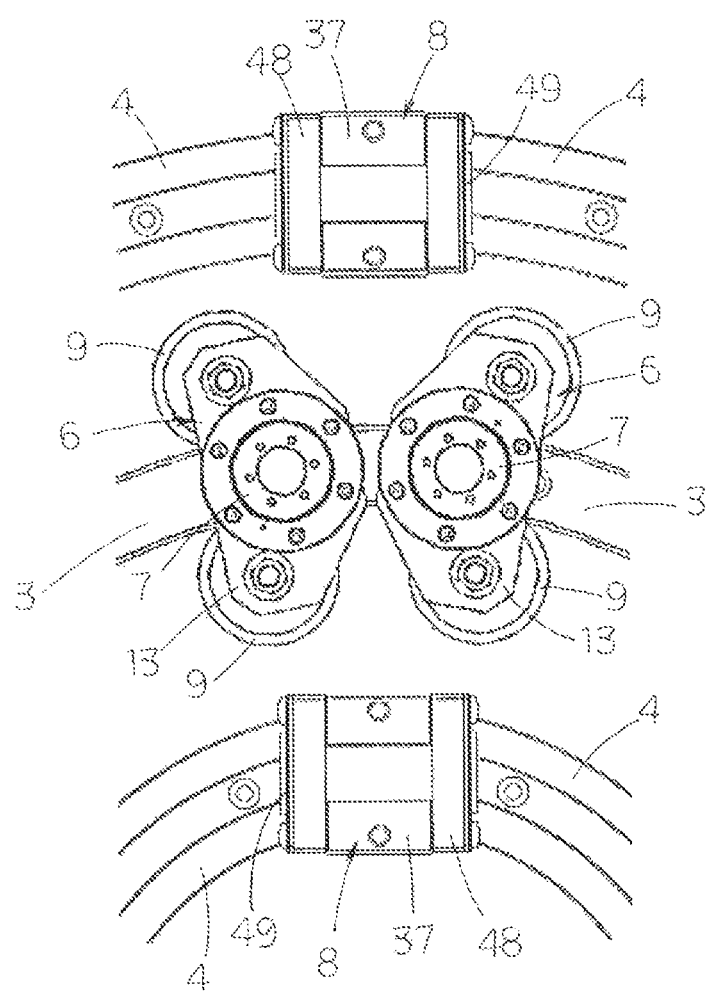
FIG. 16 is a plan view showing a state in which the table of the table circulation guide device having a pair of carriages having the configuration shown in FIG. 13 travels along a curved guide rail.

A carriage 6 shown in FIGS. 13 to 15 is a modification of the carriage 6 shown in FIGS. 8 to 10 and is suitable for roller guiding of the table 1 along a curved portion having a large curvature. In order to prevent the connecting plates 13 of two carriages 6 from colliding with each other while the table 1 is travelling on the curved rails 33, the connecting plates 13 of the two carriages 6 have notches for interference preventions 21. The notches for interference preventions 21 are formed by cutting side portions of the connecting plates 13, which side portions face each other. This configuration prevents occurrence of a phenomenon that the connecting plates 13 of the carriages 6 interfere and collide with each other when the table 1 travels on the curved rails 33. Also, as shown in FIG. 14, the rotation support shafts 11, which are the rotation centers of the rollers 9, are offset in the traveling direction from the rotation shaft 10 of the turning bearing 7 by a distance indicated by arrow E such that the distance between the axes of the rollers 9 becomes shorter. As a result, the width of the rails can be reduced, whereby the width of the apparatus can be reduced. As shown in FIG. 15, the turning bearing 7 is a cross roller bearing which is composed of an inner ring 17, an outer ring 16, and cylindrical rollers 42. A locking plate 12 is fitted into a recess 41 formed on the under surface 50 of the table 1 and fixed to the table 1 with a set screw 18. The inner ring 17 is fixed to the locking plate 12 with a set screw 18. The outer ring 16 is fixed to the connecting plate 13 with a set screw 18. The cylindrical rollers 42 roll between a raceway surface 51 of the outer ring 16 and a raceway surface 52 of the inner ring 17. When the table 1 travels on the curved rails 33, the turning bearing 7 rotates, whereby the positions of the rollers 9 of the carriage 6 are adjusted in accordance with the curvature of the curved portion. Since the cross roller bearing used as the turning bearing 7 can solely bare load in the axial direction and load in the radial direction, the turning portion can be made compact. Since each carriage 6 is fixed to the table 1 via the cross roller bearing, the carriage 6 turns in accordance with the curvature of the curved track rail 3, thereby allowing the table 1 to travel along the curved portion.

Figure 17:
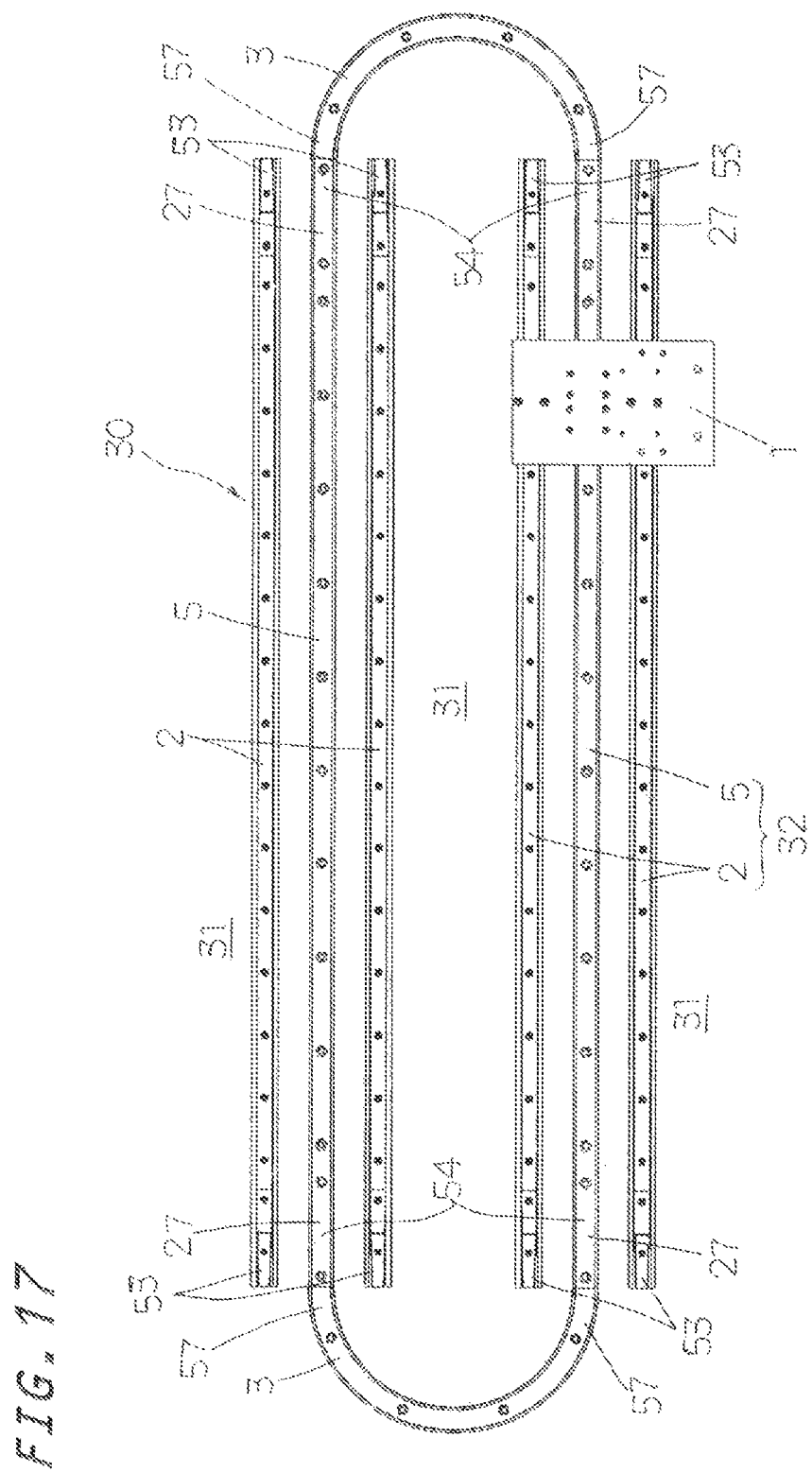
FIG. 17 is a plan view showing a second embodiment of the table circulation guide device according to the present invention in which its circuit includes no curved guide rail unlike the first embodiment.
Figure 18:
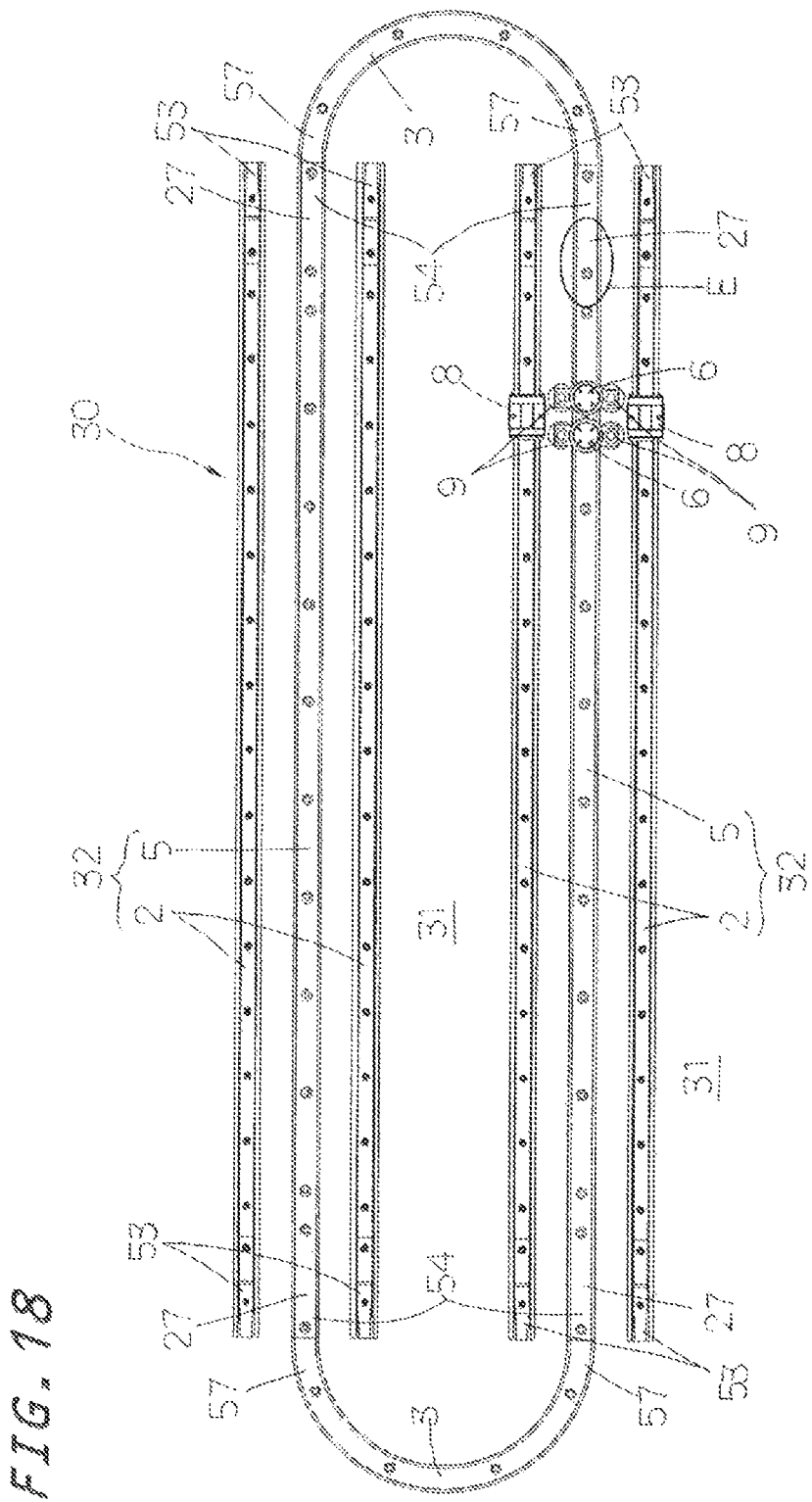
FIG. 18 is a plan view of the circuit of the table circulation guide device of FIG. 17 with its table removed.
Figure 19:
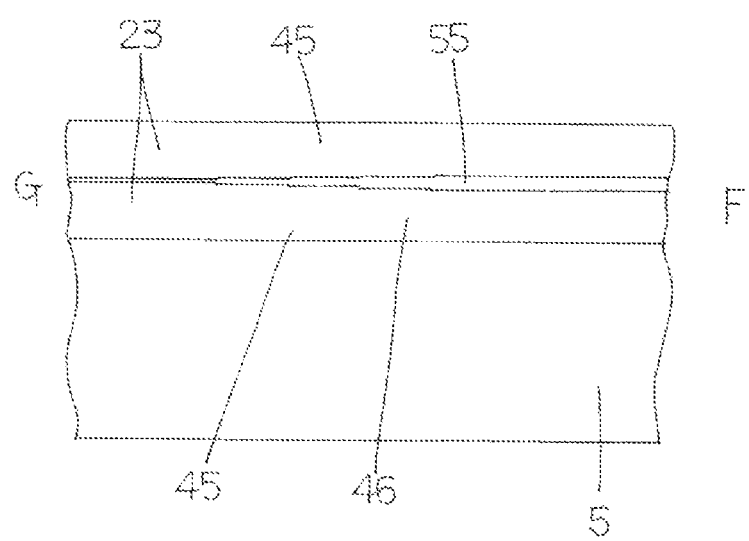
FIG. 19 is an enlarged side view of a region of FIG. 18 indicated by symbol E, wherein symbol F shows a curved track rail side, and symbol G shows a straight guide rail side, the region being a region of connection of an end portion of a straight guide rail.

Next, a second embodiment of the table circulation guide device according to the present invention will be described with reference to FIGS. 17, 18, and 19. The circuit 30 of the second embodiment is composed of two pairs of straight track rails 2 extending straight on the bed 31; straight guide rails 5 (straight rails 32) each disposed between the paired straight track rails 2; and curved track rails 3 connected to opposite end portions 54 of the straight guide rails 5. In the second embodiment, in each of the rail connecting portions 27 where the curved track rails 3 are connected to the straight guide rails 5, each of the wedge shaped projection portions 46 provided on the opposite sides of the opposite end portions 54 of each straight guide rail 5 is tapered such that its thickness increases gradually from the straight side G toward the curved track rail 3 on the curve side F. As a result, at the end portions 54 of the straight guide rail 5, the state of the sliding engagement of the wedge shaped projection portions 46 with the engaging grooves 47 changes as follows. The size of the clearances 44 between the straight guide rail 5 and the engaging grooves 47 of the rollers 9 of each carriage 6 decreases gradually, and the clearances 44 disappear at each of opposite ends of the straight guide rail 5. Subsequently, the wedge shaped projection portions 46 of the curved track rail 3 come into sliding engagement with the engaging grooves 47 of the rollers 9 of each carriage 6.

Figure 20:
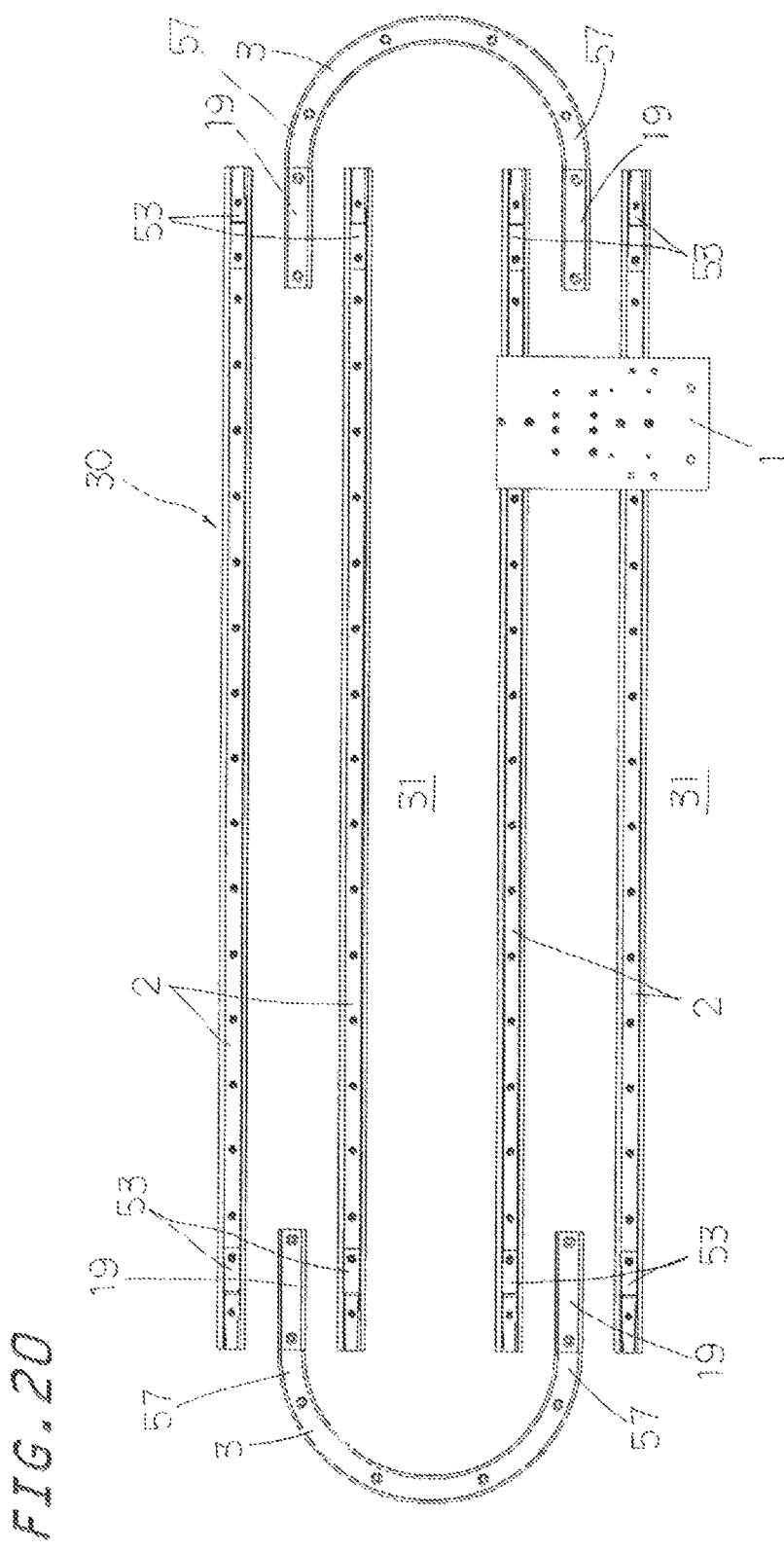
FIG. 20 is a plan view showing a third embodiment of the table circulation guide device according to the present invention in which its circuit includes no straight guide rail unlike the second embodiment.
Figure 21:
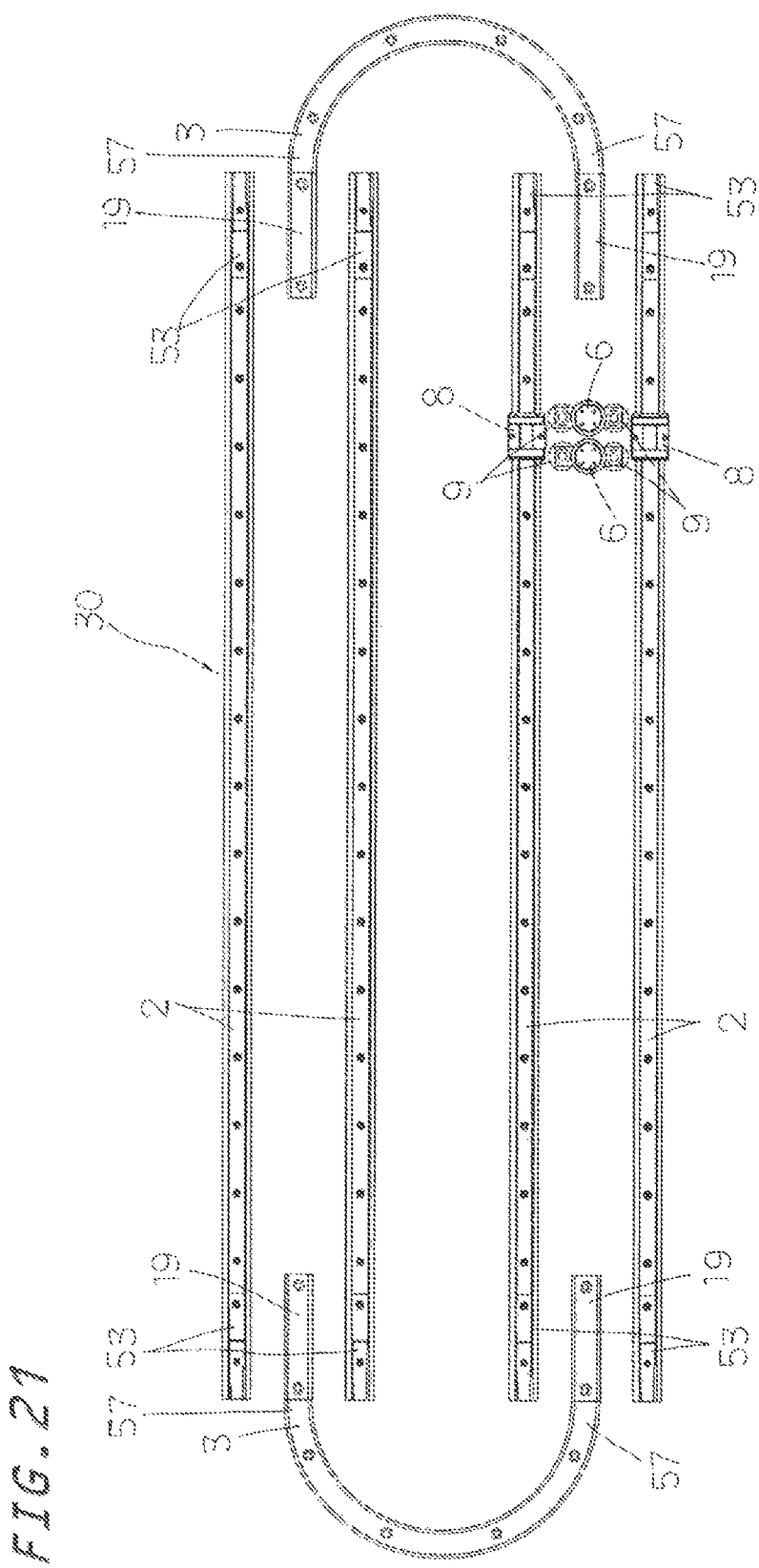
FIG. 21 is a plan view of the circuit of the table circulation guide device of FIG. 20 with its table removed.

Next, a third embodiment of the table circulation guide device according to the present invention will be described with reference to FIGS. 20 and 21. The circuit 30 of the third embodiment is composed of two pairs of straight track rails 2 extending straight on the bed 31; straight tapered guide rails 19 each disposed between first end portions 53 of each pair of the straight track rails 2; straight tapered guide rails 19 each disposed between second end portions 53 of each pair of the straight track rails 2; and curved track rails 3 with the tapered guide rails 19 connected to the opposite end portions 57 of the curved track rails 3. In the first embodiment and the second embodiment, the wedge shaped projection portions 46 at the end portions 54 of each straight guide rail 5 have tapered inclined planes 45. In the third embodiment, instead of the straight guide rail 5, the tapered guide rails 19 equivalent to the end portions 54 of the straight guide rail 5 are provided as separate components. The inclined planes 45 of the wedge shaped projection portions 46 of each tapered guide rail 19 are tapered to form the clearances 44, and large load is not imposed on the tapered guide rails 19 from the table 1. Therefore, the tapered guide rails 19 can be formed of a resin or a metal of low strength.

Figure 22:
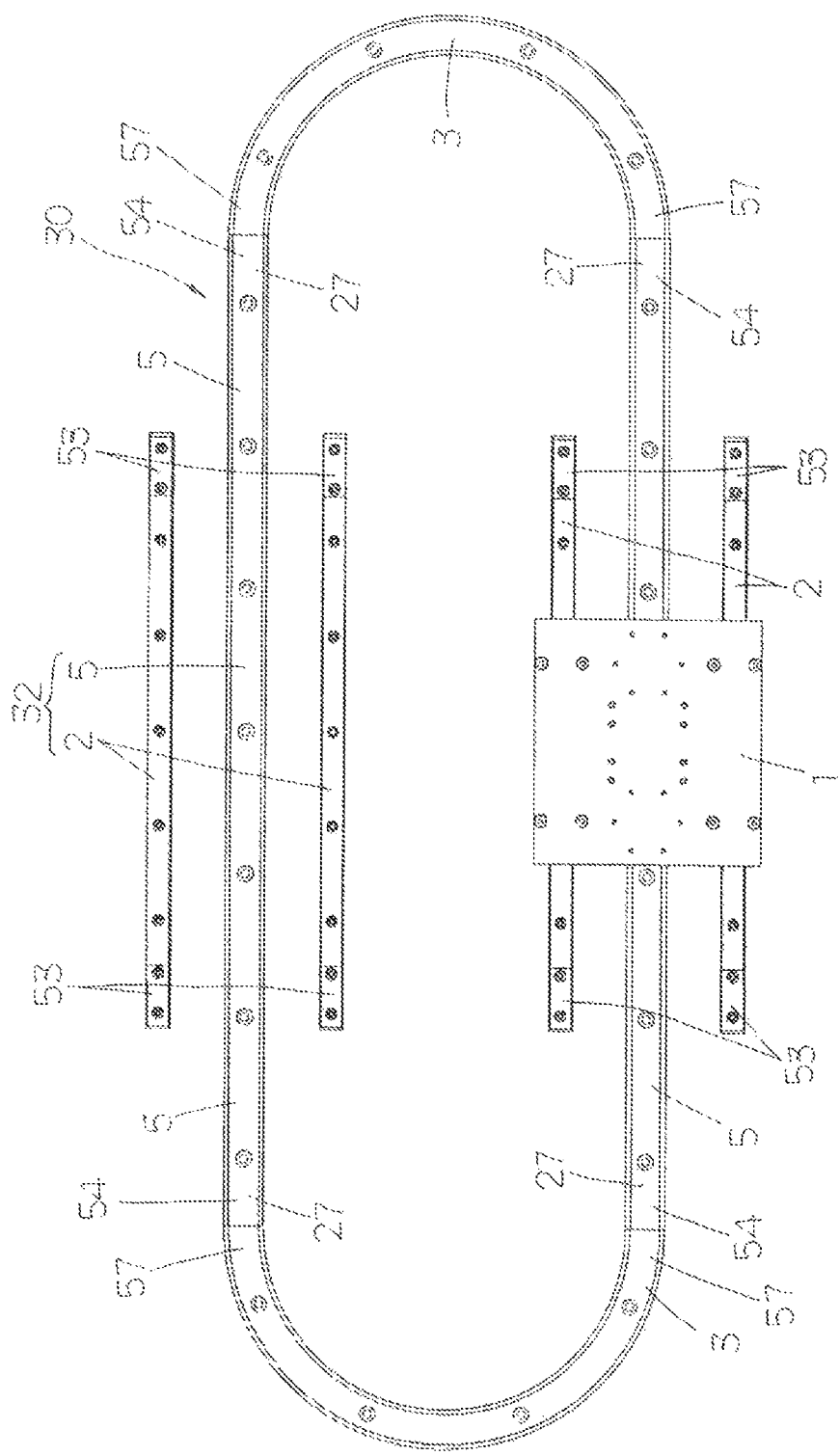
FIG. 22 is a plan view showing a fourth embodiment of the table circulation guide device according to the present invention in which its circuit includes no curved guide rail and the table has two pairs of sliders unlike the first embodiment.
Figure 23:
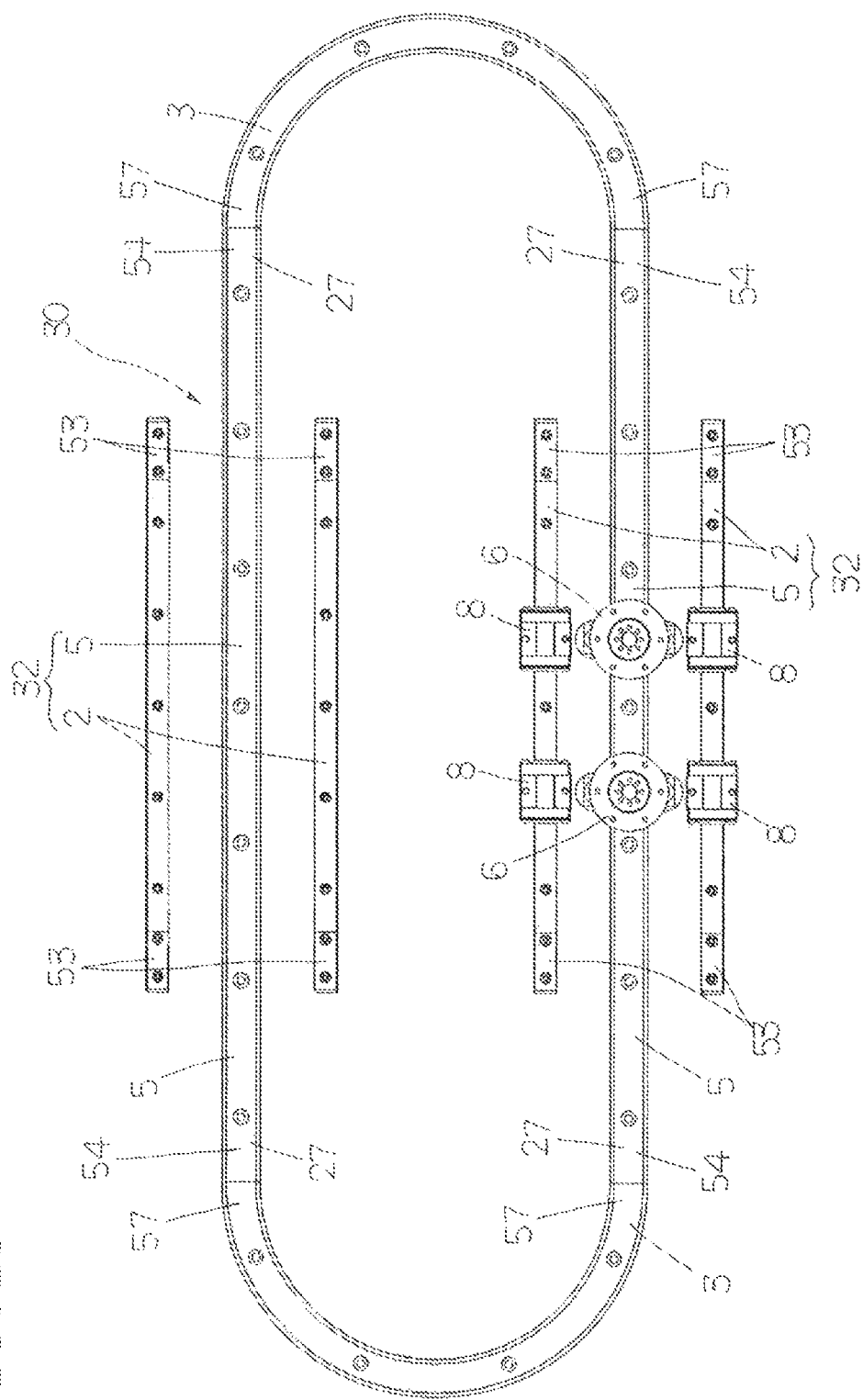
FIG. 23 is a plan view of the circuit of the table circulation guide device of FIG. 22 with its table removed.
Figure 24:
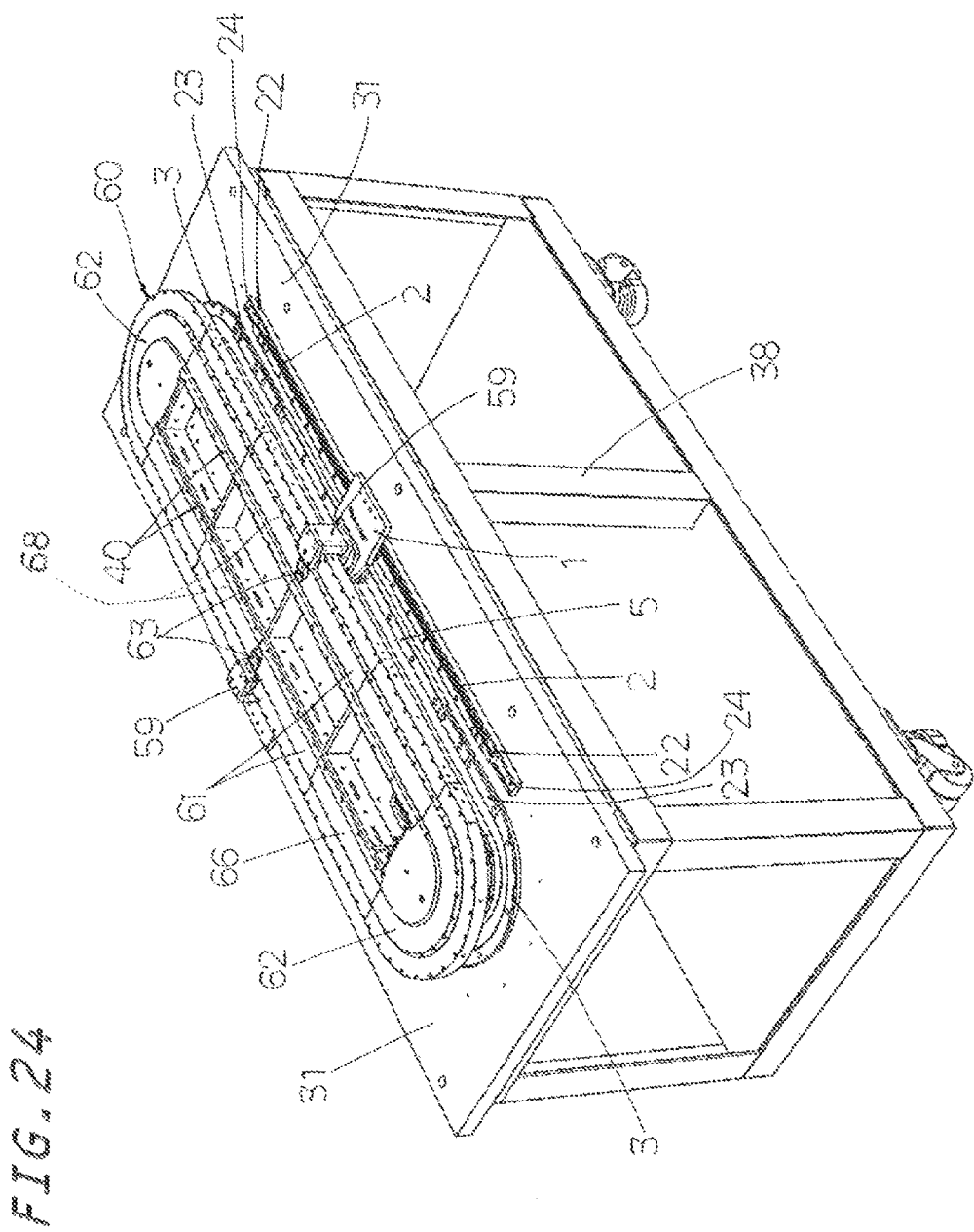
FIG. 24 is a perspective view showing another embodiment of the table circulation guide device according to the present invention.

Furthermore, a fourth embodiment of the table circulation guide device according to the present invention will be described with reference to FIGS. 22 and 23. In the fourth embodiment, the total number of the sliders 8 fixed to the table 1 is four; i.e., one pair of sliders 8 are disposed on the forward side in the traveling direction, and another pair of sliders 8 are disposed on the rear side in the traveling direction. The circuit 30 of the fourth embodiment is composed of two pairs of straight track rails 2 extending straight on the bed 31; straight guide rails 5 (straight rails 32) each disposed between the paired straight track rails 2; and curved track rails 3 connected to opposite end portions 54 of the straight guide rails 5. In the fourth embodiment, since the sliders 8 can be disposed at the four corners of the table 1, during an operation on the table 1, load is unlikely to act at a position deviated from the sliders 8, and unbalanced load is unlikely to act on the sliders 8. Even when the table circulation guide device is operated in an operation pattern in which the table 1 starts rapidly and stops rapidly so as to shorten the cycle time of the operation or the like, the table 1 is prevented from changing its attitude and can travel stably.

Next, a fifth embodiment of the table circulation guide device according to the present invention will be described with reference to FIGS. 24 to 31. In the fifth embodiment, a transport system 60 including a movable-magnet-type linear motor is used to drive tables 1; i.e., is used as driving means for circulating and transporting tables 1 on the circuit 30. The linear-motor-type transport system 60 is disposed on a frame 40 which constitutes a support base 67 on the bed 31 disposed on a stand 38 (FIG. 30). This table circulation guide device is composed of the bed 31 disposed on the stand 38, a circuit 30, and the tables 1. The circuit 30 is composed of a plurality of straight rails 32 fixedly disposed in linear motion guide regions which are working areas 28 on the bed 31 and a plurality of curved rails 33 fixedly disposed in curved motion guide regions which are non-working areas 29 on the bed 31. The tables 1 circulate and move along the various types of rails which constitute the circuit 30. The straight rails 32 include at least two pairs of straight track rails 2 which are parallel to each other, are spaced from each other, and extend in the longitudinal direction, and the curved rails 33 include a pair of curved track rails 3 which are disposed adjacent to opposite ends of the straight rails and extend to form an arc-like shape. The circuit 30 is an endless circulation circuit in which the two pairs of straight track rails 2 disposed on the bed 31 and the curved track rails 3 located adjacent to the opposite end portions of the straight track rails 2 allow circulating movement of the tables 1. The linear-motor-type transport system 60 is composed of a movable-magnet-type linear motor. The movable-magnet-type linear motor is composed of an armature assembly 68 and a field magnet 65. The armature assembly 68 is composed of armature coils which constitute a printed circuit board 66 composed of a plurality of linear modules 61 and curved modules 62 disposed on the bed 31 via the frame 40 such that they are arranged along the circuit 30. The field magnet 65 is composed of a plurality of permanent magnets which are located to face the armature coils and are supported on each table 1 via a support 59. Furthermore, the linear-motor-type transport system 60 includes a position detection system which includes a position detection sensor 63 disposed on the field magnet 65 on the table 1, and a linear scale 71 disposed along the armature assembly 68 composed of the plurality of armature coils on the bed 31. The plurality of permanent magnets constituting the field magnet 65 are disposed adjacent to one another in the traveling direction of the table 1. The plurality of armature coils constituting the armature assembly 68 are disposed adjacent to one another along the circuit 30. Although not illustrated, the armature assembly 68 has a large number of tooth portions which are disposed to face the field magnet 65, and the armature coils are wound around the tooth portions, whereby the armature coils are disposed along the circuit 30. The position detection sensor 63 moves as a result of sliding movement of the table 1 and detects the position of the table 1 along the circuit 30 through the linear scale 71. Although not illustrated, the moving speed of the table 1, etc. are controlled by a controller on the basis of information representing the detected position of the table 1. The armature coils constituting the armature assembly 68 are electrically connected to a power supply or the like through wires (not shown) which extend through wiring through holes 64 formed in the bed 31.

In the fifth embodiment, a load mounted on each table 1 is located on the outer side of the circuit 30. In consideration of the unbalanced load imposed on the table 1, the table 1 has two sliders 8 which travel on the straight track rails 2 on the outer side of the circuit 30 and one slider 8 which travels on the straight track rails 2 on the inner side of the circuit 30. This configuration allows the table 1 to travel stably irrespective of the unbalanced load imposed on the table 1. The various types of rails which constitute the circuit 30 include two pairs of straight track rails 2 extending straight on the bed 31, straight guide rails 5 each disposed between each pair of straight track rails 2, curved guide rails 4 connected to the opposite end faces of the straight track rails 2 on the inner side of the circuit 30, and curved track rail 3 connected to the opposite end faces of the straight guide rails 5.

Figure 25:
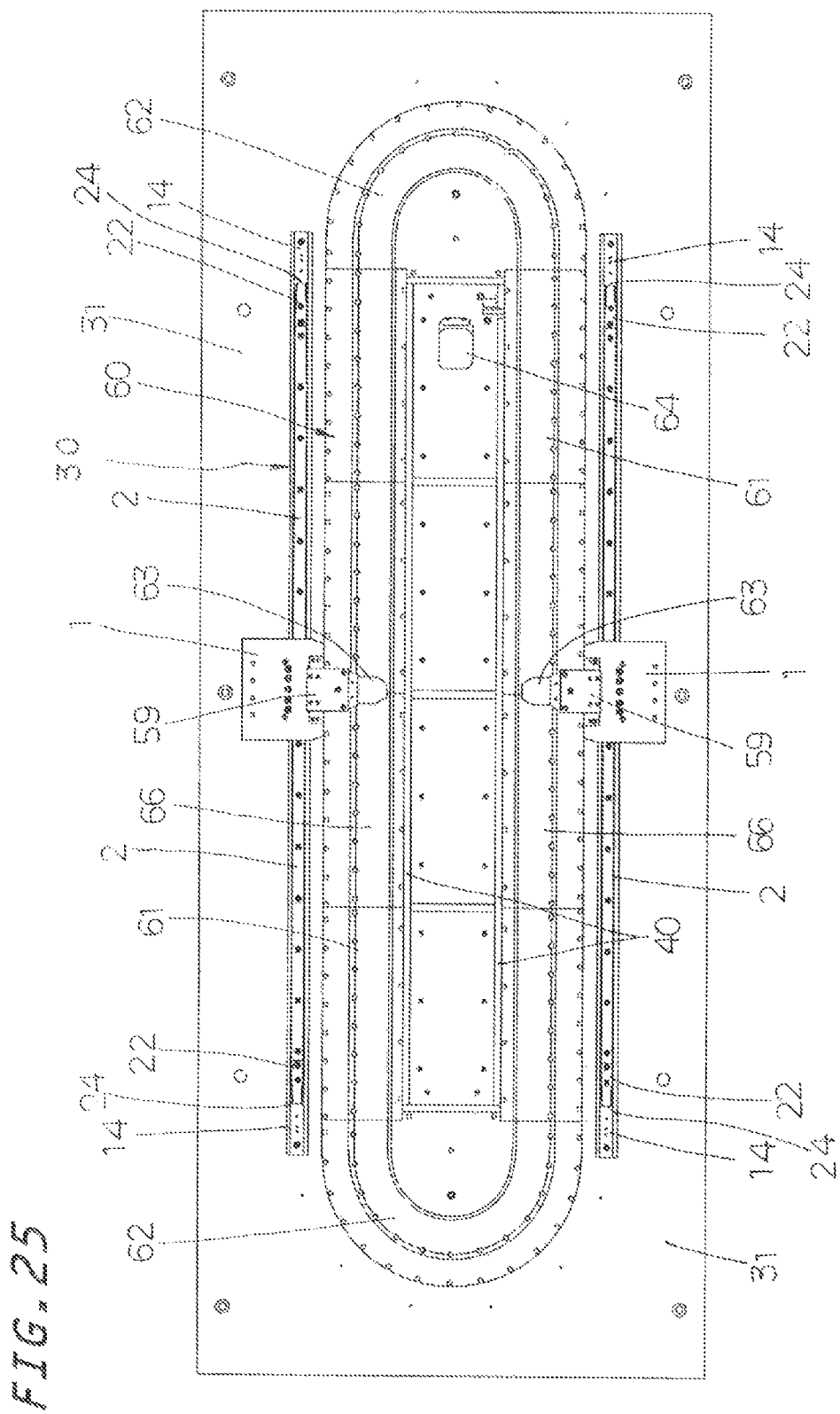
FIG. 25 is a plan view of the table circulation guide device of FIG. 24.
Figure 26:
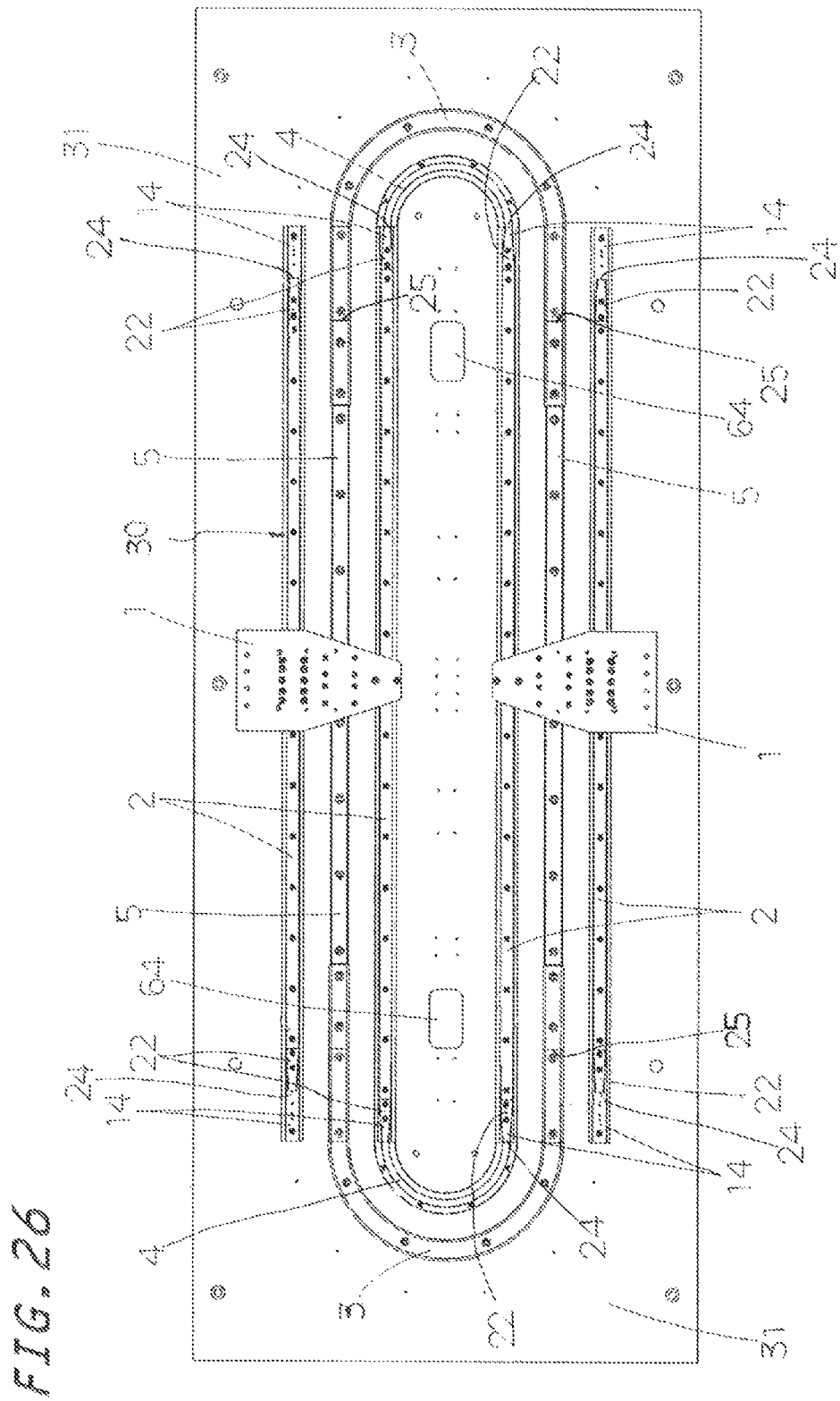
FIG. 26 is a plan view of the table circulation guide device of FIG. 24 with its linear-motor-type transport system removed for showing straight rails, curved rails, and tables.
Figure 27:
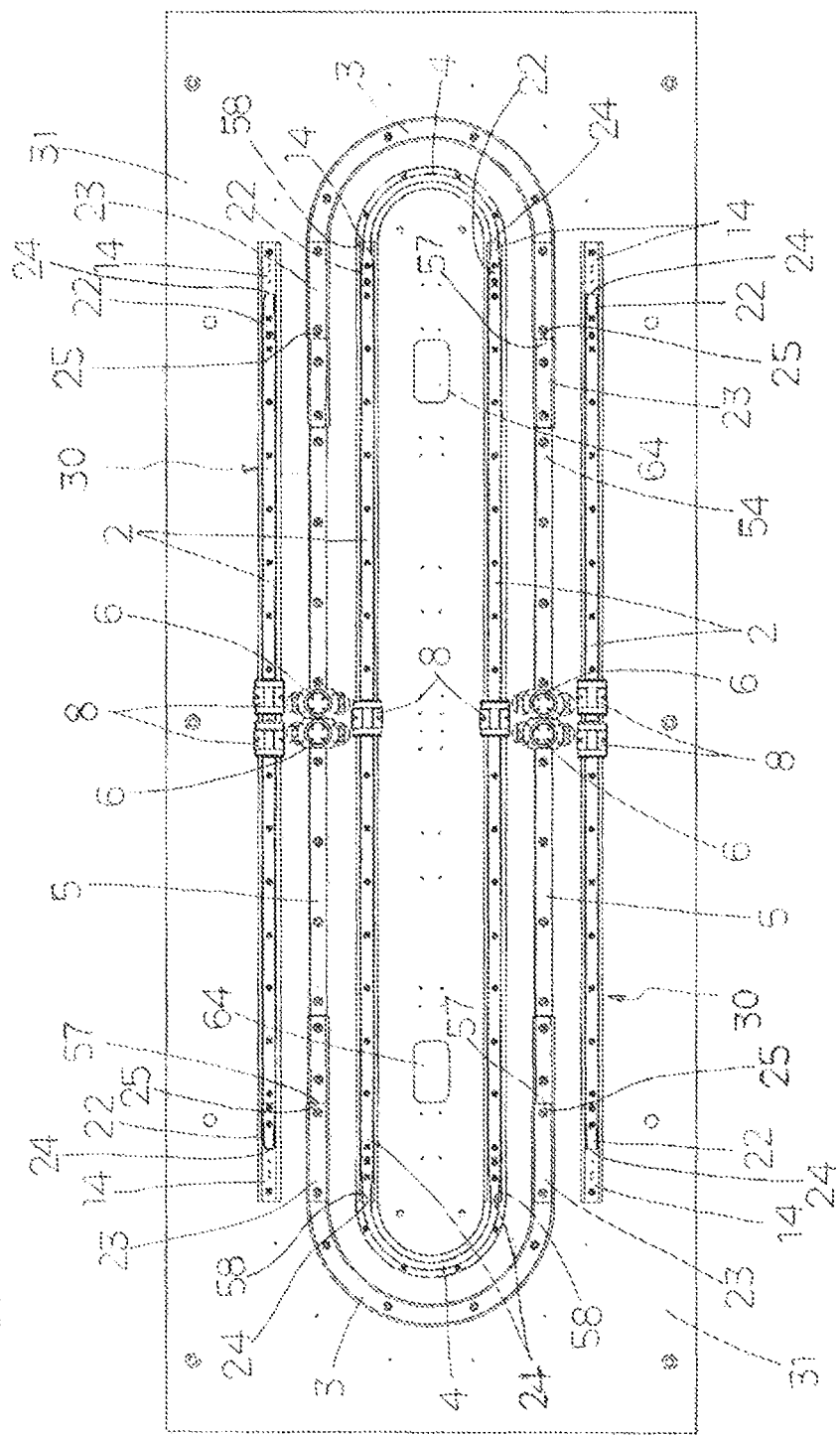
FIG. 27 is a plan view of the table circulation guide device of FIG. 26 with the table removed for showing the straight rails, the curved rails, sliders, and carriages.
Figure 28:
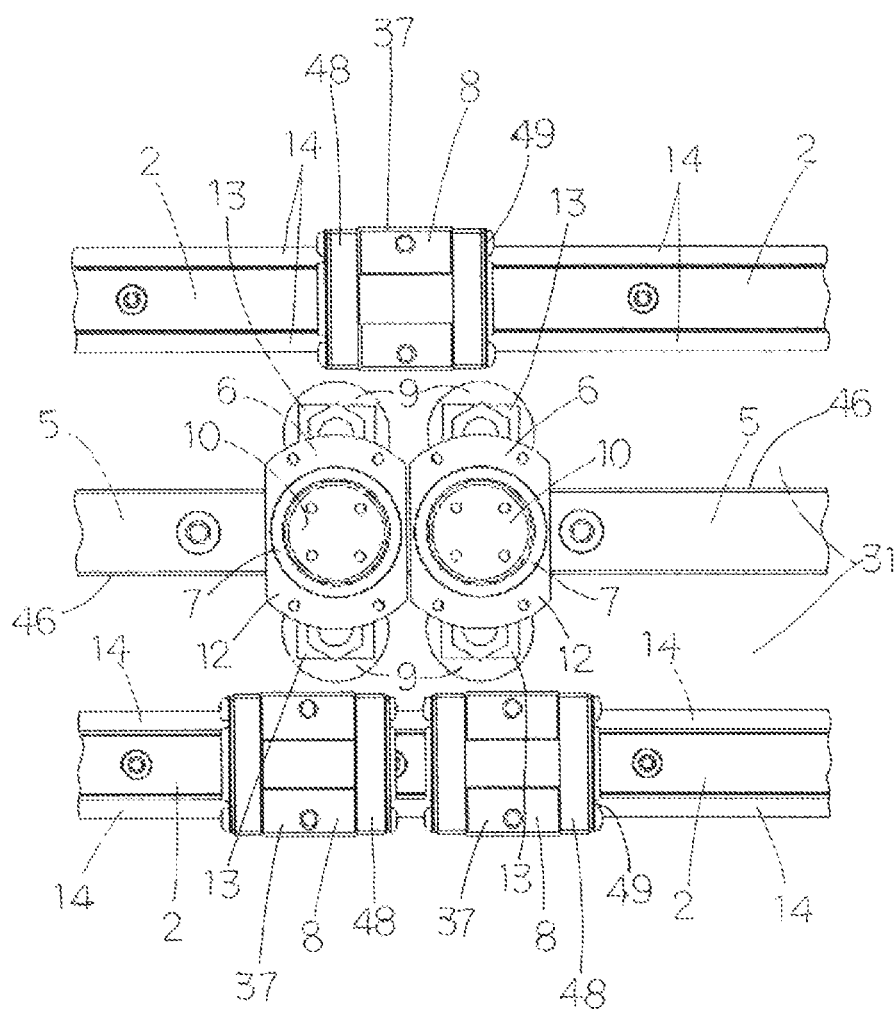
FIG. 28 is an enlarged plan view showing a portion of a straight rail region where the sliders and the carriages attached to the table of FIG. 27 are located.
Figure 29:
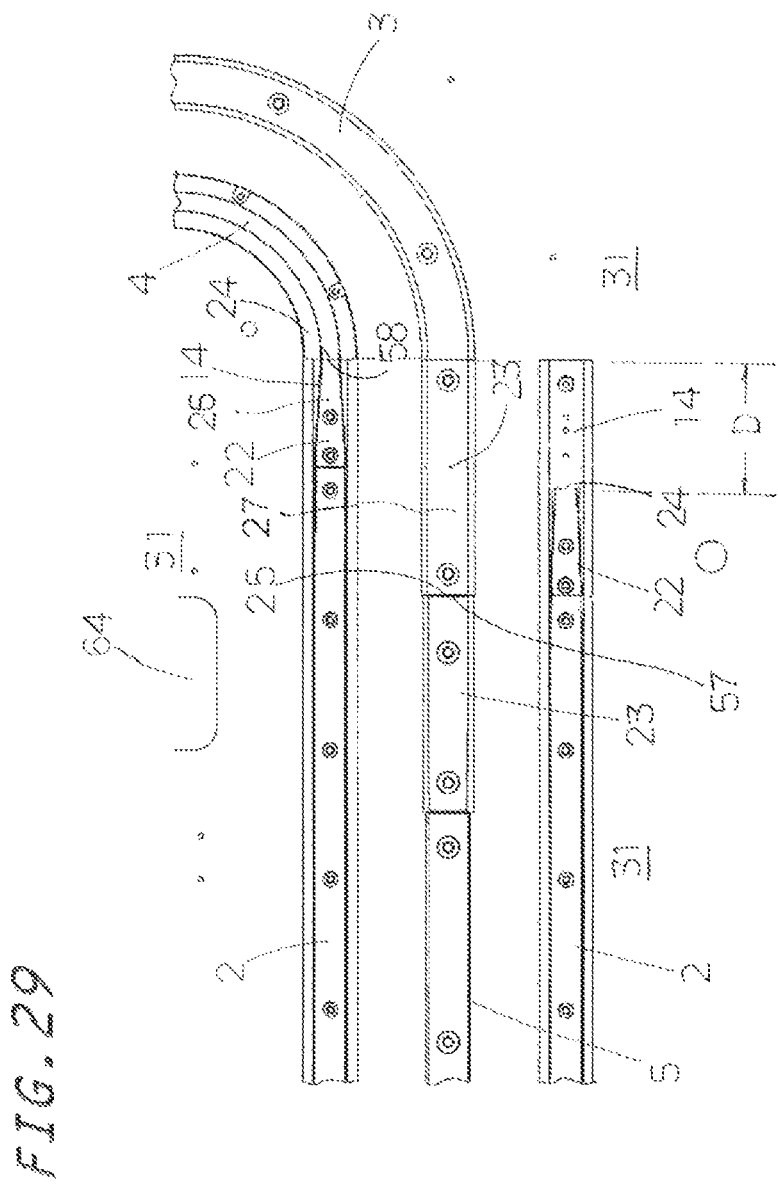
FIG. 29 is an enlarged plan view showing a boundary region between straight rails and curved rails of FIG. 28.
Figure 30:
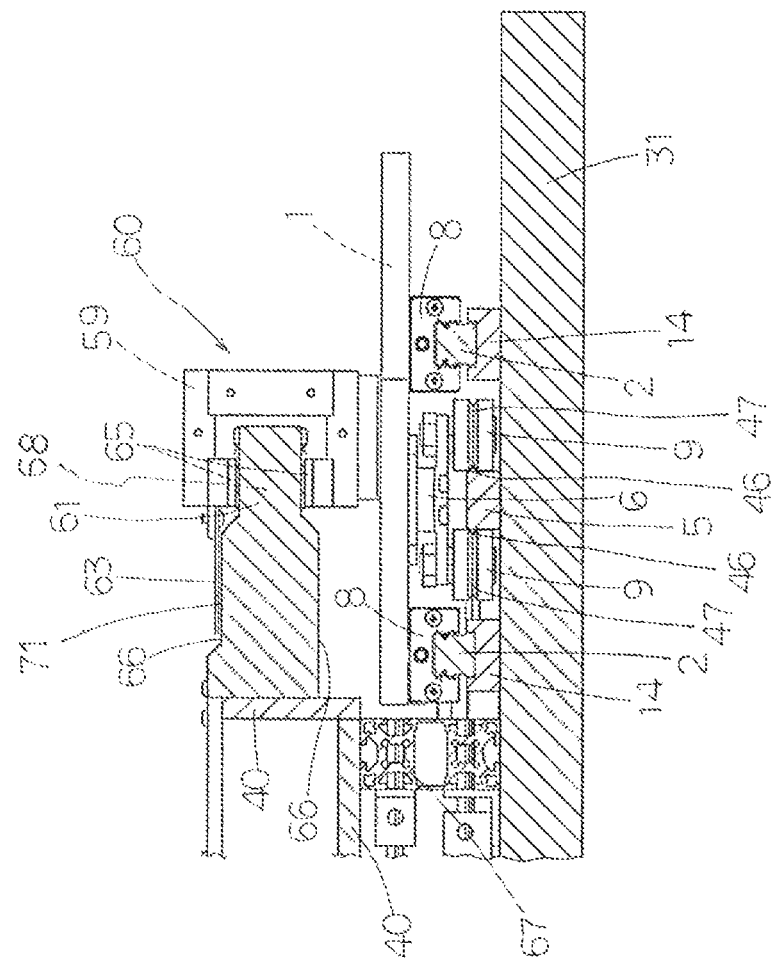
FIG. 30 is a partial sectional view showing a state in which the table of the table circulation guide device is located in the straight rail region.
Figure 31:
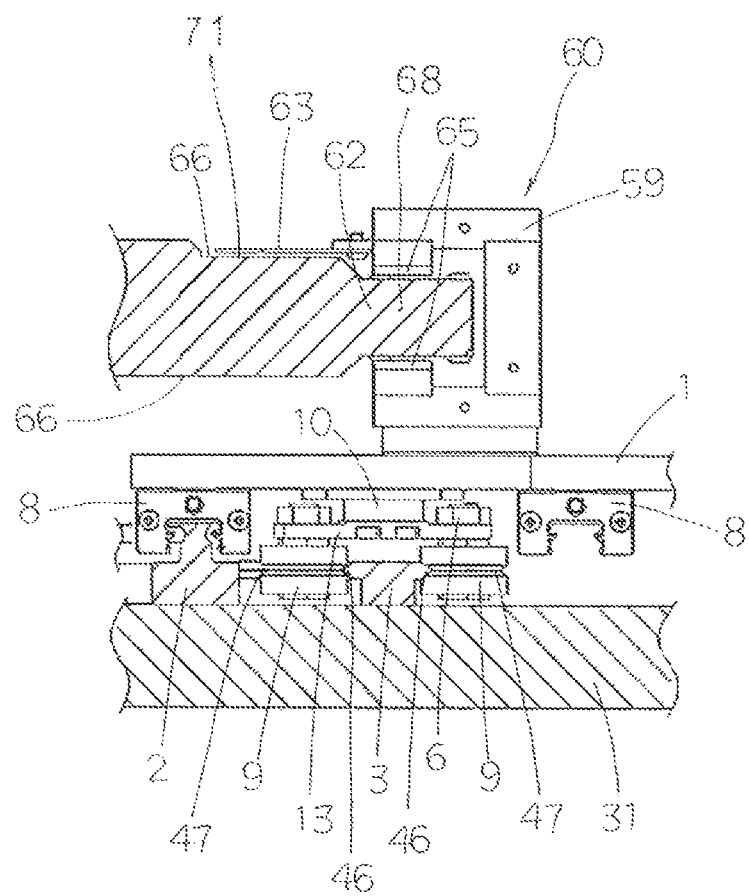
FIG. 31 is a partial sectional view showing a state in which the table of the table circulation guide device is located in the curved rail region.

In particular, the fifth embodiment is characterized in that the straight track rails 2 are disposed on the bed 31 such that, as shown in FIG. 29, one end face 24 of each straight track rail 2 on the outer side of the circuit 30 is offset in the traveling direction by an "offset amount D" from the corresponding end face 24 of the corresponding straight track rail 2 on the inner side of the circuit 30. For example, the straight track rails 2 in each pair have different lengths and are disposed such that the opposite end faces 24 of one straight track rail 2 are offset in the traveling direction from the opposite end faces 24 of the other straight track rail 2. Alternatively, as shown in FIGS. 25 to 27, the straight track rail 2 disposed on the inner side of the circuit 30 is rendered longer than the straight track rail 2 disposed on the outer side of the circuit 3. Alternatively, although not illustrated, the straight track rail 2 disposed on the inner side of the circuit 30 is rendered shorter than the straight track rail 2 disposed on the outer side of the circuit 3. Also, in this table circulation guide device, as shown in FIG. 26, a portion of the table 1 located on the inner side of the circuit 30 is tapered such that the width of the table 1 decreases toward the inner side. As shown in FIG. 27, the sliders 8 attached to the table 1 include two sliders 8 provided for the straight track rail 2 on the outer side of the circuit 30 such that the sliders 8 are spaced from each other in the traveling direction, and one slider 8 provided for the straight track rail 2 on the inner side of the circuit 30. Also, the table 1 is tapered such that the table 1 has a smaller width on the inner side. Therefore, in the case where a plurality of the tables 1 are disposed on the circuit 30 to be located adjacent to one another, interference between the tables 1 on the curved rails of the circuit 30 can be prevented. Accordingly, the tables 1 can be disposed to be closer to one another. In this table circulation guide device, as described above, the corresponding end faces 24 of the straight track rails 2 located on the inner and outer sides, respectively, of the circuit 30 are offset from each other. Therefore, the timing at which the slider 8 on the inner side passes through one end face 24 of the straight track rail 2 on the inner side differs from the timing at which the slider 8 on the outer side passes through the corresponding end face 24 of the straight track rail 2 on the outer side, so that the slider 8 on the inner side does not pass through each end face of the straight track rail 2 on the inner side simultaneously with passing of the slider 8 on the outer side through each end face of the straight track rail 2 on the outer side. In this embodiment, since the table 1 has two sliders 8 on the outer side of the circuit 30 and only one slider 8 on the inner side of the circuit 30, the outer-side slider 8 on the forward side in the traveling direction is located ahead of the inner-side slider 8. In consideration of this, the straight track rail 2 on the inner side is rendered longer than the straight track rail 2 on the outer side. In this case, when the table 1 moves from the curved rails to the straight rails, the inner-side slider 8 can engage with the straight track rail 2 on the inner side before the outer-side slider 8 on the forward side in the traveling direction engages with the straight track rail 2 on the outer side.

In this table circulation guide device, as shown in FIG. 29, the curved guide rails 4 are disposed on the inner side of the curved track rails 3 and are connected to the opposite end faces 24 of the inner-side straight track rails 2 through rail connecting portions 26. In this table circulation guide device, each curved guide rail 4 has an arc-shaped base portion fixed to the bed 31, and an arc-shaped guide portion integrally formed on the arc-shaped base portion. The arc-shaped guide portion has raceway grooves equivalent to the raceway grooves 35 formed on each straight track rail 2. However, the width of the raceway grooves of the arc-shaped guide portion is smaller than the width of the raceway grooves 35 of each straight track rail 2. Clearances of a predetermined size are formed between the raceway grooves of the arc-shaped guide portion of each curved guide rail 4 and the raceway grooves 35 of the casing 37 of the slider 8 so as to prevent the slider 8 from generating frictional resistance against the movement of the table 1 which is moved along the curved track rail 3. Furthermore, in this table circulation guide device, at each rail connecting portion 26 where the corresponding end portion 24 of the corresponding straight track rail 2 and the corresponding end portion 58 of the corresponding curved guide rail 4 are connected to each other, the end portion of the straight track rail 2 having the end face 24 is tapered such that the straight track rail 2 becomes narrow gradually, thereby forming a taper 22. As a result, the size of the clearances between the raceway grooves 35 of the straight track rail 2 and the raceway grooves 35 of the casing 37 of the slider 8 increases gradually. Due to the clearances, the rolling elements 56 of the slider 8 enter a free state at the opposite ends of the straight track rail 2, and the table 1 is smoothly guided to the traveling on the corresponding curved guide rail 4 via the carriages 6. Namely, in this table circulation guide device, at each rail connecting portion 26 where the corresponding end face 24 of the corresponding straight track rail 2 and the corresponding end portion 58 of the corresponding curved guide rail 4 are connected to each other, the end portion of the straight track rail 2 having the end face 24 is tapered such that the straight track rail 2 becomes narrow gradually, thereby forming a taper 22. As a result, the size of the clearances between the raceway grooves 35 of the straight track rail 2 and the raceway grooves 35 of the casing 37 of the slider 8 increases gradually. Due to the clearances, the rolling elements 56 of the slider 8 enter a free state at the opposite ends of the straight track rail 2 and are smoothly guided to the corresponding curved guide rail 4. In this table circulation guide device, since the curved guide rails 4 are connected to the straight track rails 2, when some external force acts on the table 1 and the table 1 travels from the straight track rails 2 to a curved portion of the circuit 30, the slider 8 move to the curved guide rail 4. Therefore, coming off of the rolling elements 56 from the slider 8 is prevented. Also, since the load of the table 1 does not act on the curved guide rails 4, the curved guide rails 4 can be formed of, for example, a resin or a metal of low strength.

As shown in FIG. 26, when the table 1 travels in the working area 28 on each pair of the straight track rails 2, the table 1 is supported by the straight track rails 2 via the one inner-side slider 8 and the two outer-side sliders 8 travelling on the straight track rails 2. When the table 1 travels in the non-working areas 29 on each curved track rail 3, the table 1 is supported by the curved track rail 3 via the pair of carriages 6 which are located between the sliders 8 attached to the table 1 and are spaced from each other in the traveling direction. Namely, in the case where this table circulation guide device is configured such that the rollers 9 of the carriages 6 and the sliders 8 provide their guiding functions simultaneously, the following phenomenon may occur. Specifically, for example, when the vertical positions of the sliders 8 and the rollers 9 deviate from their predetermined positions, the sliders 8 and the rollers 9 interfere; i.e., produce forces in opposite directions in the vertical direction, and fail to smoothly guide the table 1. In view of this, this table circulation guide device is configured such that in the region of the straight rails in the circuit 30, the table 1 moves back and forth along the straight track rails 2 via the sliders 8, and in the region of the curved rails in the circuit 30, the table 1 moves back and forth along the curved track rail 3 via the carriages 6.

In the fifth embodiment, when the table 1 travels on the curved rails, the slider 8 on the inner side of the circuit 30 travels along the curved guide rail 4 connected to the inner-side straight track rail 2. Accordingly, when the sliders 8 travel along the curved guide rail 4, the slider 8 is not restricted by the curved guide rail 4, and the slider 8 is not involved in the travel of the table 1. Also, since the clearances are present between the raceway grooves 35 of the slider 8 and the arc-shaped guide portion, the slider 8 is a slider of a type which includes a retaining member for retaining the rolling elements 56 on the casing 37, thereby preventing coming off of the rolling elements 56 from the raceway grooves 35 of the casing 37. Since no curved guide rail is provided for the sliders 8 on the outer side of the circuit 30, the outer-side sliders 8 travel in a free state. Therefore, like the inner-side sliders 8, each of the outer-side sliders 8 is a slider of a type which includes a retaining member for retaining the rolling elements 56 on the casing 37. The sliders 8 attached to the under surface 50 of the table 1 include one slider 8 for the inner-side straight track rails 2 and two slider 8 for the outer-side straight track rails 2, whereby the number of the sliders 8 used is minimized. Therefore, the weight of the table 1 including the sliders 8 can be reduced, and the inertial of the table 1 can be reduced.

In the fifth embodiment, as shown in FIG. 29, each straight guide rail 5 is disposed between the paired straight track rails 2 and is connected to the corresponding end portions 57 of the curved track rails 3 through rail connecting portions 27. As shown in FIG. 11, at the end face 25 of the straight guide rail 5, the state of the sliding engagement of the wedge shaped projection portions 46 with the engaging grooves 47 changes as follows. The size of the clearances between the straight guide rail 5 and the engaging grooves 47 of the rollers 9 of each carriage 6 decreases gradually, and the clearances disappear at each of opposite ends of the straight guide rail 5. Subsequently, the wedge shaped projection portions 46 of the curved track rail 3 come into sliding engagement with the engaging grooves 47 of the rollers 9 of each carriage 6. In the fifth embodiment, in each of the rail connecting portions 27 where the curved track rails 3 are connected to the straight guide rails 5, each of the wedge shaped projection portions 46 provided on the opposite sides of the opposite end faces 25 of the straight guide rail 5 has the taper 23; i.e., each of the wedge shaped projection portions 46 is tapered such that its thickness increases gradually from the straight side toward the curved track rail 3 on the curve side. As a result, the size of the clearances between the straight guide rail 5 and the engaging grooves 47 of the rollers 9 of each carriage 6 decreases gradually, and the clearances disappear at each of opposite ends of the straight guide rail 5. Subsequently, the wedge shaped projection portions 46 of the curved track rail 3 are fitted into the engaging grooves 47 of the rollers 9 of each carriage 6, whereby the carriage 6 is guided by the curved track rail 3 and travels smoothly. In each working area 28, the sliders 8 travel on the straight track rails 2 with no clearance formed therebetween, and the table 1 travels on the straight track rails 2 via the sliders 8. Therefore, even when a large load is imposed on the table 1, an object on the table 1 to be conveyed can be conveyed smoothly and accurately.

What is claimed is:

1. A table circulation guide device comprising:
    a bed; a circuit composed of a pair of sets of straight rails fixedly disposed in linear motion guide regions which are working areas on the bed and a pair of sets of curved rails fixedly disposed in curved motion guide regions which are non-working areas on the bed; and a table which circulates and moves along the circuit,
    wherein the sets of straight rails each include at least one pair of straight track rails which are disposed in parallel to each other such that the straight track rails are located on inner and outer sides of the circuit and extend in a traveling direction, and the sets of curved rails each include at least a single curved track rail, one of the curved track rails of the sets of curved rails extending from points between first end portions of the inner-side and outer-side straight track rails, and the other curved track rail extending from points between second end portions of the inner-side and outer-side straight track rails,
    wherein the circuit is an endless circulation circuit which is formed by the inner-side and outer-side straight track rails and the curved track rails and along which the table can circulate and move, and
    wherein a plurality of sliders and a pair of carriages are attached to an under surface of the table, wherein the sliders are disposed on opposite sides of the table in a widthwise direction of the table, straddle the inner-side and outer-side straight track rails, respectively, and slide on the inner-side and outer-side straight track rails, respectively, and
    wherein the pair of carriages are disposed between the sliders to be located at forward and rear positions in the traveling direction and travels on the curved track rails.

2. A table circulation guide device according to claim 1, wherein each of the sliders includes:
    a casing which has second raceway grooves respectively facing first raceway grooves formed on opposite side surfaces of the corresponding straight track rail and return passages extending along the second raceway grooves;
    end caps which are disposed on opposite end faces of the casing and which have arc-shaped traveling direction changing passages which establish communication between the return passages and load-carrying races formed between the first raceway grooves and the second raceway grooves; and
    rolling elements which roll in circulating passages each composed of the load-carrying race, the return passage, and a pair of the traveling direction changing passages.

3. A table circulation guide device according to claim 2, wherein each of the carriages includes:
    a connecting plate which is rotatably attached to the table via a turning bearing; and a pair of rollers which are rotatably attached to the connecting plate such that they are spaced from each other in a widthwise direction of the connecting plate,
    wherein the rollers have respective engaging grooves through which the rollers are rotatably and slidably supported by wedge shaped projection portions provided on opposite side surfaces of the curved track rail and extending in a longitudinal direction, and
    wherein the turning bearing is a cross roller bearing which includes an outer ring fixed to one of the table and the connecting plate, an inner ring fixed to the other of the table and the connecting plate, and cylindrical rollers which roll between a raceway surface of the outer ring and a raceway surface of the inner ring.

4. A table circulation guide device according to claim 3, wherein the circuit includes:
    two pairs of the inner-side and outer-side straight track rails which extend straight on the bed;
    straight guide rails each of which is disposed between a pair of the inner-side and outer-side straight track rails to extend therealong and on which the carriages travel;
    two pairs of inner-side and outer-side curved guide rails on which the sliders slide, one pair of the inner-side and outer-side curved guide rails being connected to the first end portions of the inner-side and outer-side straight track rails, respectively, and the other pair of the inner-side and outer-side curved guide rails being connected to the second end portions of the inner-side and outer-side straight track rails, respectively; and the curved track rails on which the carriages travel, one of the curved track rails being connected to first end portions of the straight guide rails, and the other of the curved track rails being connected to second end portions of the straight guide rails.

5. A table circulation guide device according to claim 4, wherein the inner-side and outer-side curved guide rails are disposed on the inner and outer sides of the curved track rails and are connected to the corresponding end portions of the inner-side and outer-side straight track rails through first rail connecting portions; and the straight guide rails are each disposed between the corresponding inner-side and outer-side straight track rails and are connected to opposite end portions of the curved track rails through second rail connecting portions.

6. A table circulation guide device according to claim 4, wherein first clearances are formed between each of the curved guide rails and the second raceway grooves of the casing of each slider, and second clearances are formed between the wedge shaped projection portions of each of the straight guide rails and the engaging grooves of the rollers of each of the carriages.

7. A table circulation guide device according to claim 6, wherein in each of the first rail connecting portions through which the straight track rails are connected to the curved guide rails, the corresponding end portion of the corresponding straight track rail is tapered such that the straight track rail is narrowed gradually, whereby the size of clearances between the straight track rail and the second raceway groove of the casing of the slider increases gradually and becomes approximately equal to that of the first clearances; when the slider reaches each of the end portions of the straight track rail, due to the clearances, the rolling elements enter a free state; and then the slider is guided to the curved guide rail.

8. A table circulation guide device according to claim 6, wherein in each of the second rail connecting portions through which the curved track rails are connected to the straight guide rails, the wedge shaped projection portions of the corresponding end portion of the corresponding straight guide rail is tapered such that the thickness of the wedge shaped projection portions increases toward the corresponding curved track rail, whereby the size of the second clearances between the wedge shaped projection portions of each of the straight guide rails and the engaging grooves of the rollers of each of the carriages decreases gradually; at each of the opposite end portions of the straight guide rail, the second clearances between the wedge shaped projection portions of the straight guide rail and the engaging grooves of the rollers of the carriage disappear; the wedge shaped projection portions of the curved track rail engage with the engaging grooves of the rollers of the carriage; and the carriage travels on the curved track rail while being guided by the curved track rail.

9. A table circulation guide device according to claim 4, wherein shims for height adjustment are disposed between a top surface of the bed and the lower surfaces of the straight track rails which support the sliders; and each of the curved guide rails has an arc-shaped base portion having a height corresponding to the height of the shims, and an arc-shaped guide portion which protrudes from an upper surface of the arc-shaped base portion into a space between the raceway grooves of the casing of the slider and which is smaller in width than the straight track rail.

10. A table circulation guide device according to claim 3, wherein each of the carriages is configured such that, in order to shorten a distance between axes of the rollers, rotation support shafts of the rollers are offset in the traveling direction from a rotation shaft of the turning bearing by a predetermined distance; the carriages are attached to the under surface of the table such that the carriages are spaced from each other in the traveling direction of the table; and in order to prevent the connecting plates of the carriages from colliding with each other, the connecting plates of the carriages have notches for interference preventions, the notches for interference preventions being formed by cutting side portions of the connecting plates, which side portions face each other.

11. A table circulation guide device according to claim 1, wherein the circuit includes:

first and second pairs of the inner-side and outer-side straight track rails which extend straight on the bed;

straight guide rails each of which is one of the straight rails and is disposed between a pair of the inner-side and outer-side straight track rails; and a pair of the curved track rails, one of the curved track rails extending from a point between the first end portions of the inner-side and outer-side straight track rails in the first straight track rail pair and a point between the first end portions of the inner-side and outer-side straight track rails in the second straight track rail pair, and the other curved track rail extending from a point between the second end portions of the inner-side and outer-side straight track rails in the first straight track rail pair and a point between the second end portions of the inner-side and outer-side straight track rails in the second straight track rail pair.

12. A table circulation guide device according to claim 1, wherein the circuit includes:

first and second pairs of the inner-side and outer-side straight track rails which extend straight on the bed;

straight guide rails each of which is one of the straight rails and is disposed between a pair of the inner-side and outer-side straight track rails;

first and second pairs of tapered guide rails, one of the first pair of tapered guide rails being disposed between the first end portions of the inner-side and outer-side straight track rails in the first straight track rail pair, the other of the first pair of tapered guide rails being disposed between the first end portions of the inner-side and outer-side straight track rails in the second straight track rail pair, one of the second pair of tapered guide rails being disposed between the second end portions of the inner-side and outer-side straight track rails in the first straight track rail pair, the other of the second pair of tapered guide rails being disposed between the second end portions of the inner-side and outer-side straight track rails in the second straight track rail pair; and a pair of the curved track rails, one of the curved track rails being connected to the first pair of tapered guide rails, and the other of the curved track rails being connected to the second pair of tapered guide rails.

13. A table circulation guide device according to claim 1, wherein the carriages which slide on the curved track rails are attached to the under surface of the table such that the carriages are spaced from each other in the traveling direction of the table; and the sliders which slide on the straight track rails are attached to the under surface of the table such that the slides are spaced from each other in the widthwise direction of the table or such that the slides are spaced from each other in the traveling direction of the table and in the widthwise direction of the table.

14. A table circulation guide device according to claim 1, wherein the bed having the endless circulation circuit formed thereon is disposed on a stand;
- the table is circulated and transported on the circuit by a linear-motor-type transport system;
- the endless circulation circuit includes first and second pairs of the inner-side and outer-side straight track rails, and a pair of the curved track rails, one of the curved track rails extending from a point between the first end portions of the inner-side and outer-side straight track rails in the first straight track rail pair and a point between the first end portions of the inner-side and outer-side straight track rails in the second straight track rail pair, and the other curved track rail extending from a point between the second end portions of the inner-side and outer-side straight track rails in the first straight track rail pair and a point between the second end portions of the inner-side and outer-side straight track rails in the second straight track rail pair; and
- the inner-side and outer-side straight track rails are disposed on the bed such that each of opposite end faces of the outer-side straight track rail in each straight track rail pair is offset in the traveling direction from the corresponding end face of the inner-side straight track rail in the same straight track rail pair.

15. A table circulation guide device according to claim 14, wherein the end portions of each of the straight track rails is tapered; and the inner-side and outer-side straight track rails in each straight track rail pair have different lengths.

16. A table circulation guide device according to claim 14, wherein the linear-motor-type transport system includes: a movable-magnet-type linear motor composed of a field magnet disposed on the table and an armature assembly disposed on the bed; and a position detection system composed of a position detection sensor disposed on the field magnet on the bed and a linear scale disposed along the armature assembly on the bed.

17. A table circulation guide device according to claim 14, wherein the table is tapered such that the width of the table in the traveling direction decreases toward the inner side of the circuit; the sliders attached to the table includes two sliders provided for the outer-side straight track rail of the circuit such that the two sliders are spaced from each other in the traveling direction and a single slider provided for the inner-side straight track rail of the circuit; and the timing at which the slider on the inner side passes through one end face of the inner-side straight track rail differs from the timing at which the slider on the outer side passes through the corresponding end face of the outer-side straight track rail.

* * * * *